US009590978B2

(12) United States Patent
Joyce, III

(10) Patent No.: US 9,590,978 B2
(45) Date of Patent: Mar. 7, 2017

(54) VERIFICATION OF PASSWORD USING A KEYBOARD WITH A SECURE PASSWORD ENTRY MODE

(71) Applicant: ADVANCED BIOMETRIC CONTROLS, LLC, Reston, VA (US)

(72) Inventor: Arthur W Joyce, III, Vienna, VA (US)

(73) Assignee: BiObex, LLC, Reston, VA (US)

( * ) Notice: Subject to any disclaimer, the term of this patent is extended or adjusted under 35 U.S.C. 154(b) by 218 days.

(21) Appl. No.: 14/136,069

(22) Filed: Dec. 20, 2013

(65) Prior Publication Data
US 2014/0181529 A1 Jun. 26, 2014

Related U.S. Application Data

(60) Provisional application No. 61/740,947, filed on Dec. 21, 2012, provisional application No. 61/827,836, filed on May 28, 2013.

(51) Int. Cl.
*G06F 21/46* (2013.01)
*H04L 29/06* (2006.01)
(Continued)

(52) U.S. Cl.
CPC .......... *H04L 63/083* (2013.01); *G06F 21/31* (2013.01); *G06F 21/83* (2013.01);
(Continued)

(58) Field of Classification Search
CPC ...................................... G06F 21/46
See application file for complete search history.

(56) References Cited

U.S. PATENT DOCUMENTS 5,365,587 A * 11/1994 Campbell et al. ............ 713/183
6,134,661 A    10/2000 Topp
(Continued)

FOREIGN PATENT DOCUMENTS

EP    1152378 A2    11/2001
GB    2267986 A     12/1993
(Continued)

OTHER PUBLICATIONS

Handbook of Applied cryptography, CRC Press, Boca Raton, FL, US, Aug. 2, 2016.
(Continued)

*Primary Examiner* — Josnel Jeudy
(74) *Attorney, Agent, or Firm* — Dennemeyer & Associates, LLC

(57) ABSTRACT

The present invention includes a device and method to authenticate a user to a computer prior to the user having access to the computer or network. As user name and password protocols are nearly ubiquitous in authentication applications used today, there have been developed many nefarious techniques to defeat the security of such systems. It is relatively easy to write a computer program to guess passwords and then use those passwords to defeat security and cause harm and mischief to a computer, its users and others. To thwart such activity, the present invention provides a novel device that can be provided within a keyboard, in a computer, or in a third device having connectivity thereto. The device in conjunction with the method provides a secure password mode and a challenge/response protocol to verify that the password is entered in response to a particular request for a password.

4 Claims, 16 Drawing Sheets

(51) Int. Cl.
*G06F 21/31* (2013.01)
*G06F 21/83* (2013.01)
*H04L 29/08* (2006.01)

(52) U.S. Cl.
CPC ............... *G06F 2221/2103* (2013.01); *G06F 2221/2151* (2013.01); *H04L 63/0823* (2013.01); *H04L 67/02* (2013.01)

(56) References Cited

U.S. PATENT DOCUMENTS

| | | | |
|---|---|---|---|
| 6,630,927 B2* | 10/2003 | Sherman et al. | 345/168 |
| 2002/0166048 A1* | 11/2002 | Coulier | 713/169 |
| 2005/0066186 A1 | 3/2005 | Gentle et al. | |
| 2006/0105712 A1* | 5/2006 | Glass et al. | 455/41.2 |
| 2006/0112270 A1 | 5/2006 | Erez | |
| 2008/0059796 A1 | 3/2008 | Ishimoto | |
| 2009/0300744 A1* | 12/2009 | Guo et al. | 726/7 |
| 2010/0293598 A1* | 11/2010 | Collart et al. | 726/3 |

FOREIGN PATENT DOCUMENTS

| | | |
|---|---|---|
| WO | 0110079 A1 | 2/2001 |
| WO | 2009031140 A2 | 3/2009 |

OTHER PUBLICATIONS

Extended European Search Report, Aug. 2011.
PCT International Search Report for PCT/US2013/077035; counterpart to present application.

\* cited by examiner

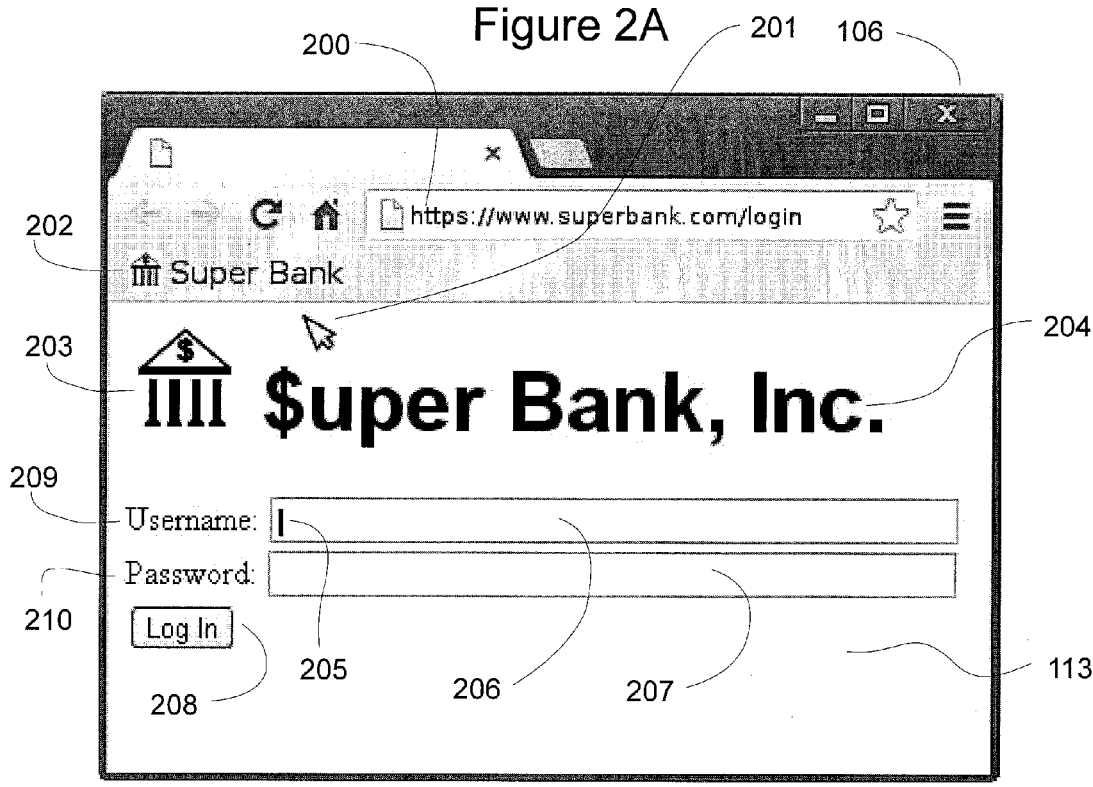

```
250 — <HTML><BODY>
251 — <DIV style="font-family:Arial; font-size:40px; font-weight:bold;">
252 — <IMG SRC="BankIcon.png"> $uper Bank, Inc.</DIV><BR>
253 — <FORM method="POST" action="https://www.superbank.com/account">"
254 — Username:
255 — <INPUT TYPE="text" NAME="UserName" SIZE="50" >           263
256 — <BR>
257 — Password:
258 — <INPUT TYPE="password" NAME="Password" SIZE="50" NONCE="1234">
259 — <BR>
260 — <INPUT TYPE="submit" VALUE="Log In" >
261 — </FORM>                                                  264
262 — </BODY></HTML>
```

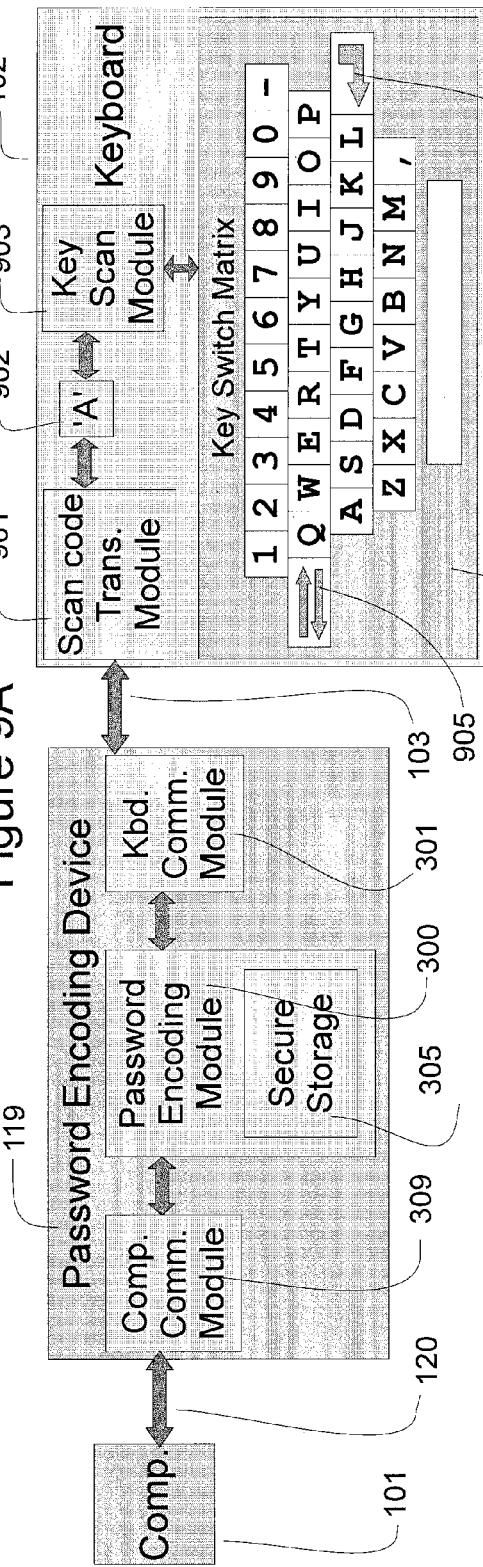
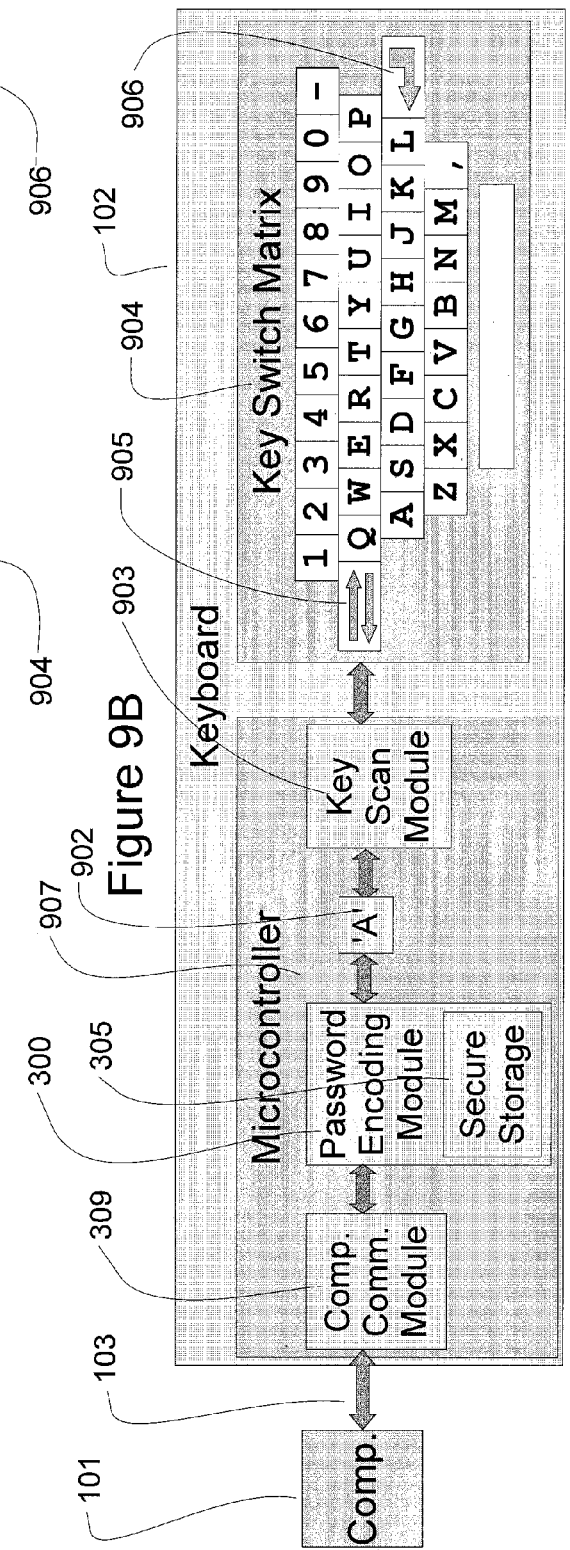
Figure 9A
Figure 9B

VERIFICATION OF PASSWORD USING A KEYBOARD WITH A SECURE PASSWORD ENTRY MODE

CROSS-REFERENCE TO RELATED APPLICATIONS

The present application is related to U.S. Provisional Patent Application Nos. 61/740,947 and 61/827,836, all incorporated herein as if set forth in full.

FIELD OF THE INVENTION

The present invention concerns password authentication for use in computer and other data input applications. More particularly the present invention concerns a password encoding module, comprising hardware and/or software that modifies the interaction between a computer and a keyboard to provide a password entry and verification capability including the ability to determine if the password was generated in response to a request for a password or otherwise and details of the password's genesis.

BACKGROUND OF THE INVENTION

User name and password are nearly ubiquitous in authentication applications today. The user name is a claimed identity and the submitted password is evidence that the user knows a secret. In security circles, this is referred to as "something you know" authentication. Sometimes a password comprises a sequence of numbers, which is referred to as a Personal Identification Number (PIN). (In authentication parlance, "evidence" is the feature, document, object or action that is used to confirm the identity of an individual. For instance, the signature on a check is "evidence" that the account holder authored the document.)

Generally a password is entered using a keyboard. Examples of keyboards are those attached to a computer, those that are part of an ATM (Automatic Teller Machine), the number pad on a telephone, or the virtual keyboard that use touch screens on smart phones or tablet style computers.

A password is basically a string, which is a sequence of characters. When the password is used to logon to a website, it is little more than a block of bytes passed as part of an HTTP message. All that is needed to impersonate the legitimate user is knowledge of the password string. For online services, impersonation can occur at any time from almost any place in the world.

The present invention discloses how novel means can be applied to password encoding and password validation modules for text-based authentication.

SUMMARY OF THE INVENTION

This invention discloses a password-encoding module that encrypts or otherwise obscures passwords to protect them from eavesdropping. In addition, a challenge/response protocol ensures that the password is being provided in response to a particular request for a password.

In a preferred embodiment of the present invention, a method of verifying a password entered via a keyboard is provided for a computing device prior to permitting access to a user. The method comprises the steps of providing a password device, in communication with the keyboard and the computing device, to receive one or more messages, receive keystroke information comprising a manifestation of the pressing of keys on the keyboard, create one or more messages and transmit the one or more messages created. Then, receiving in the password device a command message comprising a command for the password device to operate in a special mode and challenge-data having one or more corresponding challenge-responses and receiving keystroke information in the password device during the special mode. Receiving in the password device a command to stop operating in the special mode, creating in the password device a message based on data comprising keystroke information and one of the challenge-responses to the challenge-data in the command message and transmitting the created message to the computing device.

Some preferred embodiments include the additional steps of retrieving secret data from a stored secret data location within the password device and creating in the password device a message based on information comprising keystroke information, one of the challenge-responses to the challenge-data in the command message and the secret data retrieved from storage in the password device.

In addition, the method can include a communication module dedicated to communicating with either the computing device or the keyboard or both the computing device and the keyboard. In a preferred embodiment, the method can further comprise a key switch matrix, and a key switch module that senses the pressing of keys in the key switch matrix.

The password device, in some embodiments, further comprises a communication module for communicating with an external storage device such that the password device can retrieve secret-data from the external storage device. In such embodiments, the method further comprises the steps of retrieving data from storage within the password device using the secret-data retrieved from the external storage device. The password device can, in such embodiments, further comprises a physical interface for connecting to a secure digital memory card, such that the physical interface has connected thereto an external device communication module for connecting to a secure digital (SD) memory card. In some of these embodiments, the step of creating a message, based on input comprising keystroke information and one of the challenge-responses to the challenge-data in the command message, is performed on an external device.

It will be understood that the method of verifying a password of one of the preferred embodiments can further comprise some or all of the steps of: receiving in the password device a message containing a public key; creating in the password device random data; encrypting in the password device the random data using the public key; transmitting from the password device the encrypted random data; and storing the random data in the secret-data storage. As a further enhancement, the method can comprise the steps of: transmitting from the password device a message containing a public key; receiving in the password device an encrypted message; decrypting the encrypted message in the password device using a private key associated with the public key and storing the decrypted message in secret-data storage in the password device. In addition, some embodiments will include the steps of receiving in the password device a message containing a public key; creating, in the password device, random data; encrypting, in the password device, the random data using the public key; transmitting, from the password device, the encrypted-random-data; transmitting, from the password device, a message containing a second public key; receiving, in the password device, a second message; decrypting, the second message in the password device using a private key associated with the second public key, and storing, in the secret-data storage, the data created using the random data and the decrypted second message.

Some embodiments will include the steps of creating in the password device a digital signature based on information comprising keystroke information, one of the one or more challenge-responses to the challenge-data in the command message and the secret data retrieved from storage in the password device; and creating in the password device a message based on information comprising keystroke information, one of the challenge-responses to the challenge-data in the command message, the secret data retrieved from storage in the password device, and the digital signature. Further, the method of verifying a password can include the step of creating in the password device a message based on information comprising keystroke information, one of the challenge-responses to the challenge-data in the command message, and the device identification information. In addition, in an embodiment, the steps of creating in the password device a digital signature based on information comprising keystroke information, one of the challenge responses to the challenge-data in the command message and the secret-data retrieved from storage in the password device and creating in the password device, a message based on information comprising keystroke information, one of the challenge-responses to the challenge-data in the command message, the secret data retrieved from storage in the password device, the digital signature, and a device identification information can be performed.

It will be seen that the present invention provides a method for authenticating a person to a computer based on a user name and password without establishing a direct connection between the computer and a device, which comprise the steps of the computer generating and transmitting session-specific data, the computer receiving one or more messages comprising a user name and encoded password data, the computer retrieving device data, the computer retrieving user data based on the user name, the computer authenticating the encoded password data based on the retrieved device data, the retrieved user data and the generated session specific data, the improvement comprising adding the steps wherein the encoded password packet is decrypted using information in the device-data, and the computer and device transmit and receive over a public network, such as the Internet.

The invention can be enhanced wherein the encoded password packet contains a hash of the plaintext text generated by the person; the retrieved user data contains a hash of the user's password; and wherein the step of the computer authenticating the password data further comprises the step of comparing the hash of the password contained in the encoded password packet and the hash of the password contained in the retrieved user data. In addition in a preferred embodiment, the encoded password packet contains a digital signature of the session-specific data and the password data. A further enhancement includes the computer further authenticating the encoded password packet based on the association between the device identification information and the user name.

Finally, the invention discloses a method for authenticating a user to a computer based on user name and password without establishing a direct connection between the computer and a device, comprising the steps of the computer being prompted to generate and transmit session-specific data, a password device receiving the session specific data, the password device entering a special mode, the password device receiving keystroke information, the password device retrieving secret data stored in the password device, the device generating and transmitting one or more messages based on the received session-specific data, the keystrokes and secret data, the password device transmitting a password device ID. The computer or a second computing device transmits user identification information. Further steps include the computer receiving the one or more transmitted messages and the user identification information. Once received, the further steps include the computer retrieving user data based on the user identification information, the computer retrieving password-device-data based on the password-device-ID, and the computer validating the one or more received messages based on the user data the password device data and session-specific data.

In addition, the method for authenticating to a user to a computer based on user name and password comprises the steps of the computer transmitting a computer public key, receiving in the password device a message containing the computer public key, creating in the password device a first random data, and encrypting in the password device the first random data using the computer public key. Then, transmitting from the password device the encrypted random data, transmitting from the password device a message containing the password device public key, receiving in the computer the encrypted random data, receiving in the computer a message containing the password device public key, creating in the computer a second random data and encrypting in the computer the second random data. The method includes transmitting from the computer the second encrypted random data, receiving in the password device the second encrypted random data, decrypting random data in the password device, using a password device private key associated with the password device public key, storing, in the password device, secret-data-storage data created using the first random data and the decrypted second encrypted random data and decrypting the first encrypted random data in the computer using the computer private key associated with the computer public key. The step of storing, in the computer, secret-data-storage data created using the second random data and the decrypted first encrypted random data concludes one embodiment of the invention.

An ideal embodiment includes the password-encoding module in a keyboard. Another embodiment is a password-encoding device, where the keyboard plugs into the password encoding device and the password encoding device plugs into a computer. Other embodiments will be disclosed below.

In ideal embodiments, the password-encoding module (PEM) has two modes of operation. In the first mode, transparent mode, the PEM is electronically transparent, meaning that the PEM passes all keystrokes to the computer unaltered. In the second mode, password mode, the PEM saves any characters that the user enters, i.e. the password, in a buffer. At the end of password mode, perhaps indicated when the user hit the "Enter" or "Tab" key, the PEM creates an encrypted password packet, transmits the encrypted password packet to the computer and returns to transparent mode. The password packet, perhaps in a network friendly format, such as Base-64 ASCII, is sent to an authentication server, or other requesting system, where it is decrypted and validated.

The password packet is encrypted, encoded or digitally signed in a manner that can be used to verify the integrity of the packet. The packet also includes data that verifies that the password was typed into the keyboard in response to a particular request for a password. For ease of understanding, the first several paragraphs of the detailed description below include background in the current state of the art in this field, explained in association with drawings used to represent the prior art methods of password requests and acceptance protocols.

A more detailed explanation of the invention is provided in the following description and claims and is illustrated in the accompanying drawings.

BRIEF DESCRIPTION OF THE SEVERAL VIEWS OF THE FIGURES

FIGS. 2A, 2B and 2C show an example login webpage, the corresponding HTML and the login process.

FIGS. 9A and 9B are schematic representations of embodiments of the present invention.

DETAILED DESCRIPTION OF THE ILLUSTRATIVE EMBODIMENT

Figure 1A:
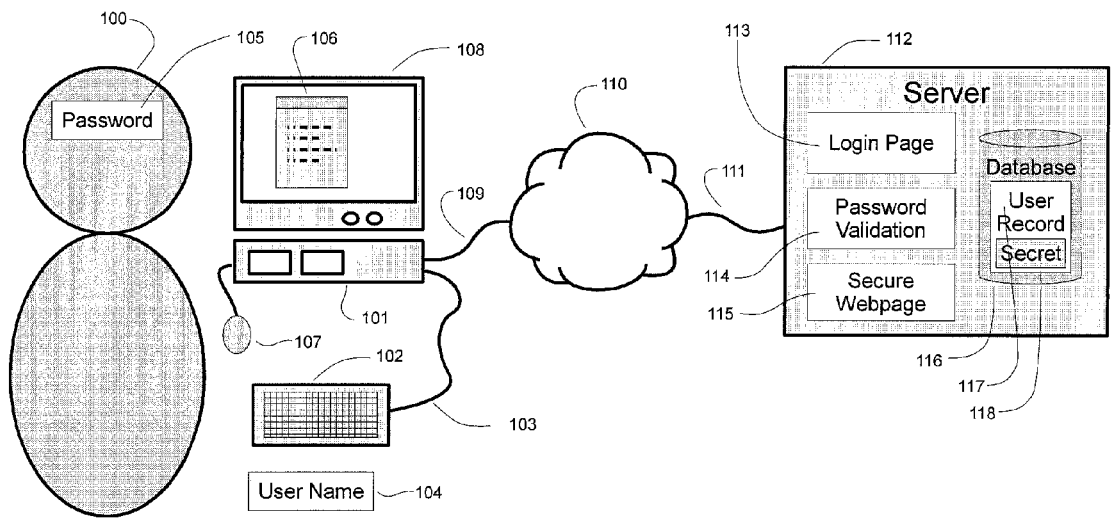
FIGS. 1A and 1B are graphical representations of the relationship between the entities involved in the transaction.

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("Detailed Description of an Illustrative Embodiment") relates to a requirement of the United States Patent Office, and should not be found to limit the subject matter disclosed herein.

It will be understood that the following discussion is phrased in the context of a user sitting at a computer using a browser to view information on a server connected to the Internet. However, this should not be construed as limiting; persons having ordinary skill in the art will recognize that the present invention is applicable to many other situations where a password or other text-based authentication is required, for example (but not intended to be limiting), logging into a computer, accessing an ATM, opening a safe or deactivating an alarm system.

In some instances a line or an arrow will be utilized in the drawings to indicate an action. Referring now to the drawings, FIG. 1A is a graphical representation of elements involved in a sample transaction of the type typical in computer usage today. User 100 operates computer 101 using keyboard 102, which is connected to computer 101 by keyboard-cable 103. It will be understood that while keyboard 102 is shows as connected via a cable to computer 101, keyboard 102 might be attached by other means, including wireless means such as Bluetooth® connectivity, or other means; without departing from the novel scope of the present invention. (For this discussion, a keystroke is the physical depression and release of a key on keyboard 102.) While computer 101 is shown in the illustrative embodiment as a desktop style computer, persons having ordinary skill in the art will understand that the present invention is applicable to laptop, notebook and other computers as well as tablets, smart phones and other types of computerized and electronic devices that have keyboard elements including physical and touch screen keyboards.

User 100 views information from computer 101 on monitor 108. In one example of a transaction of the type the present invention is concerned with, as shown in FIG. 1A, user 100 is viewing webpages using browser-program 106. The computer is connected to network 110 via network-connection 109. Network 110 may include the Internet, local area networks, or other networks known to persons having ordinary skill in the art. It will be understood that this is a simple schematic used herein for purposes of explanation and should not be seen as limiting within the myriad of possible arrangements of these entities.

Server 112, of a type well known to persons having ordinary skill in the art, is connected to network 110 via network-connection 111. Server 112 comprises standard software available to the public to produce a login-webpage (or pop-up) 113, password-validation-module 114 and one or more instances of secure-webpage 115 to which access is restricted. Typically, server 112 includes one or more instances of database 116 of a type known to persons having ordinary skill in the art.

In this example, server 112 transmits webpages, however this example should not be considered to be limiting. A non-limiting list of other activities that server 112 might be able to perform includes authorizing the transfer of money to a merchant, affecting data stored on database 116, voting, buying or selling stock, viewing or creating e-mails, uploading or downloading files, or any other activity known to persons with ordinary skill in the art or to which server 112 can be used.

Typically, when user 100 requests access to secure-webpage 115, server 112 prompts user 100 for a user-name and password by transmitting login-webpage 113. Browser-program 106 displays login-webpage 113. User-name 104 is a text string that links user 100 to user-record 117 in a manner known to persons with ordinary skill in the art. Password 105 is a string of characters in user 100's head that is used to authenticate user 100's identity. User 100 enters user-name 104 and password 105. (This process will be described in more detail below.) Browser-program 106 transmits user-name 104 and password 105 to server 112. Server 112 invokes password-validation-module 114 to validate user-name 104 and password 105. If user-name 104 and password 105 are valid, server 112 transmits secure-webpage 115.

Persons with ordinary skill in the art will recognize that this discussion is simple and is only for purposes of explanation. Validating user-name 104 and password 105 only authenticates user 100. There are numerous possible steps and methods that might be used to determine if user 100 is actually authorized to perform the requested process, which in this example is: view secure-webpage 115.

FIG. 2 shows webpage elements and HTML encodings, known to persons with ordinary skill in the art. FIG. 2A shows browser-program 106 displaying an example login-webpage 113. In this example, the elements of login-webpage 113 are assumed to be from legitimate server 112. Login-webpage 113 contains visual identification elements such as icon 203 and text 204.

As presently practiced and well known to persons with ordinary skill in the art, a user name and password authenticated login may proceed as follows: User 100 starts browser-program 106, for instance Microsoft's Internet Explorer®, Google Chrome or Mozilla Firefox®. User 100 might have received login-webpage 113 in response to clicking on bookmark 202 using mouse 107. Or user 100 might have received login-webpage 113 by typing webpage-URL 200 using keyboard 102. Other means of requesting login-webpage 113 will be known to persons with ordinary skill in the art. Login-webpage 113 typically comprises three elements, user-name-input-field 206, password-input-field 207 and login-button 208. When browser-program 106 displays login-webpage 113, text-entry-cursor 205 is placed in user-name-input-field 206. (It will be understood that text-entry-cursor 205 indicates the "input focus" of browser-program 106. The "input focus" is the element that responds to keystroke messages. In this case, keystroke messages will cause characters to appear in user-name-input-field 206.) User 100 types in user-name 104 that associates user 100 with server 112. User 100 push the 'Tab' key 905, as shown in FIG. 9A, on keyboard 102. In response to the 'tab' input, browser-program 106 advances text-entry-cursor 205 to password-input-field 207. User 100 then types in password 105 using keyboard 102 to produce a plaintext password string. Typically, as browser-program 106 receives each plaintext password character, it displays dots or asterisk "*" characters instead of the actual password characters. Displaying dots or asterisks prevents a person or camera from visually observing password 105. When user 100 has finished entering password 105, user 100 pushes the "Enter" key 906 (as shown on FIG. 9A). In response to the "enter" input character, browser-program 106 activates login-button 208. (User 100 might also use mouse 107 to activate login-button 208). Activating login-button 208 causes browser-program 106 to transmit user-name 104 and a plaintext copy of password 105 to server 112.

FIG. 2B shows the login-page-HTML 249, made up of lines 250-262, that represents login-webpage 113. HTML-header-line 250 tells browser-program 106 that login-page-HTML 249 uses the HTML standard. Font-line 251 tells browser-program 106 what font and size to use for text 204. Visual-elements-line 252 tells browser-program 106 to display icon 203 and text 204. User-name-text-line 254 tells browser-program 106 to display user-name-text-element 209. User-name-input-line 255 tells browser to display user-name-input-field 206. First-break-line 256 tells browser-program 106 to start a "new line", so that, when browser displays password-text-element 210, password-text-element 210 is at the left-hand side of login-webpage 113 and below user-name-text-element 209. Password-text-line 257 tells browser-program 106 to display password-text-element 210. Password-input-line 258 tells browser-program 106 to display password-input-field 207. Second-break-line 259 tells browser-program 106 to display login-button 208 below password-text-element 210 and at the left-hand side of login-webpage 113. Login-button-line 260 tells browser-program 106 to display login-button 208. HTML-footer-line 262 tells browser-program 106 that it has reached the end of HTML instructions that create login-webpage 113.

Form-header-line 253 tells browser-program 106 that the lines that follow form-header-line 253 are part of an HTML form. Form-footer-line 261 tells browser-program 106 that it has reached the end of the HTML form definition begun at form-header-line 253. The visual elements within the form definition, i.e. user-name-text-element 209 and password-text-element 210, are not significant to the form definition. When user 100 activates login-button 208, browser-program 106 retrieves the text entered into user-name-input-field 206 and password-input-field 207. Browser-program 106 sends this text, presumed to be user-name 104 and password 105 in the example discussion, in the form of an HTTP "POST" message, to submission-URL 263.

Figure 2C:
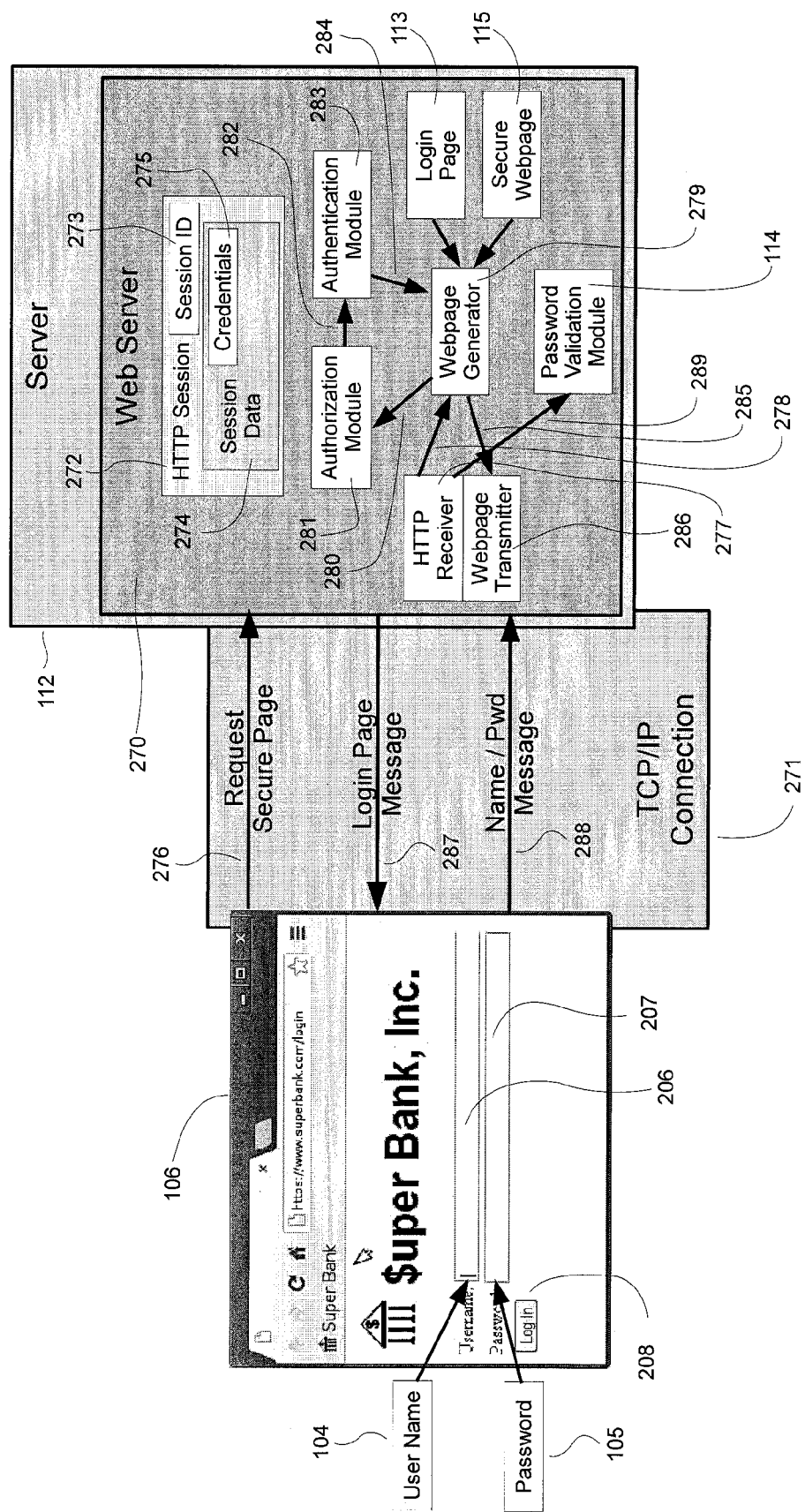

Now referring to FIG. 2C, the login transactions are shown at the system level. It will be understood that FIG. 2C and the following discussion on web servers is for purposes of explanation and is not a general description of web servers. Web servers are often large complicated software packages. The schema shown in FIG. 2C is greatly simplified for brevity and clarity.

Embodiments of web servers are readily available to users, either as free, open source packages on the Internet, or as commercial software packages. Examples of open source web servers include JBoss from jboss.org, Jetty from eclipse.org and Tomcat from the Apache Software Foundation. Examples of commercial web servers include WebLogic from Oracle and WebSphere from IBM.

In this example embodiment, server 112 contains web-server 270 of a type known to persons with ordinary skill in the art. Message traffic passes between browser-program 106 and web-server 270 over network 110 using a protocol call referred to as TCP/IP (Transfer Control Protocol/Internet Protocol). TCP/IP is used to establish TCP/IP-connection 271 between browser-program 106 and web-server 270. Login-webpage 113, secure-webpage 115 and other webpages are typically encoded in HTML (Hyper-Text Mark-up Language). In embodiments of the present invention using the Internet, the protocol used by browser-program 106 and the web-server 270 to request and send these pages is called HTTP (Hyper-Text Transfer Protocol) a protocol known to persons having ordinary skill in the art. It will also be understood then that when accessing protected resources, TCP/IP-connection 271 is often protected with a secure protocol such as Secure Socket Layer (SSL) or Transport Layer Security (TLS) (not shown for brevity).

When web-server 270 and browser-program 106 connect, server 112 typically establishes HTTP-session 272. HTTP-session 272 is a means of maintaining continuity when user 100 directs browser-program 106 among a plurality of webpages generated by web-server 270. HTTP-session 272 typically includes a session-ID 273 linked to session-data 274. Session-data 274 is how web-server 270 maintains such things as shopping cart contents, search preferences and login-credentials 275, along with other while user 100 "surfs" a website. It will be understood that web-server 270 can read data from session-data 274 when web-server 270 generates webpages. Likewise, web-server 270 can store data in session-data 274 when web-server 270 receives messages from browser 106-program. When browser-program 106 and web-server 270 break TCP/IP connection web-server 270 deletes HTTP-session 272 and all data contained in HTTP-session 272.

As shown in FIG. 2C, the login process begins when browser-program 106 transmits request-secure-page-message, as indicated by arrow 276. Typically the login will be encoded using the HTTP protocol and typically a "GET" or a "POST" message. HTTP-receiver 277 examines request-secure-page-message 276 and based on the contents of request-secure-page-message 276, in ways known to persons with ordinary skill in the art, sends forwarded-request-secure-page-message 278 to a webpage-generator 279. Webpage-generator 279, based on the contents of forwarded-request-secure-page-message 278 recognizes that authorization is required before transmitting secure-webpage 115. Webpage-generator 279 sends request-authorization-message, as indicated by arrow 280 in FIG. 2C, to authorization-module 281 in order to discern if HTTP-session 272 contains login-credentials 275 with sufficient authorization to view secure-webpage 115. In the example transaction shown, authorization-module 281 does not find login-credentials 275 present, such that authorization-module 281 is caused to send a request-authentication-message, as indicated by arrow 282, to authentication-module 283, and instructing authentication-module 283 to determine the identity of user 100.

Authentication-module 283 sends a generate-login-page-message, as indicated by arrow 284, to webpage-generator 279 instructing webpage-generator 279 to render login-webpage 113. Webpage-generator 279 produces login-page-HTML 249, made up of lines 250-262 as shown in FIG. 2B. Login-page-HTML-message, as indicated by arrow 285, sends login-page-HTML 249 to webpage transmitter 286, which in turn sends login-page-message, as indicated by arrow 287, which contains login page HTML 249, to browser-program 106.

As described above, browser-program 106 displays login-webpage 113 so that user 100 can type a user-name 104 and password 105 into user-name-input-field 206 and password-input-field 207 respectively. User 100 activates login-button 208 causing browser-program 106 to transmit the user-name/password-message, as indicated by arrow 288, which is presumed to carry user-name 104 and password 105 to web-server 270.

HTTP-receiver 277, using methods known to persons with ordinary skill in the art, recognizes that the user-name/password-message 288 contains a user name and password information and transmits forwarded-password-validation-message, as indicated by arrow 289, to a password-validation-module 114. Typically, user-name 104 and password 105 are sent to web-server 270 as plaintext fields within user-name/password-message 288; it will be understood, however that any manner of sending user-name/password-message 288 can be used without departing from the novel scope of the present invention.

Continuing in FIG. 2C, it will be seen that web-server 270 uses user-name 104 provided to retrieve user-record 117 from database 116. Server 112 compares the user's-secret-data 118, stored in the database 116, to the password string contents of user-name/password-message 288, presumed to be password 105 and if the comparison indicates that user-name/password-message 288 contains a valid user name and password combination, web-server 270 accepts user-name/password-message 288 as proof of the identity of user 100. Password-validation-module 114 then produces login-credentials 275 and stores login-credentials 275 in session-data 274, for use as described in further detail below. Following steps not shown for brevity but well known to persons with ordinary skill in the art, webpage-generator 279 produces HTML text representing a secure-webpage 115 and forwards the HTML text to a webpage-transmitter 286. Finally, browser-program 106 displays secure-webpage 115 on monitor 108 and user 100 sees secure-webpage 115.

It will be understood that this is a simple example that should not be considered limiting. Many websites today use a two-step login process, such that a user name is entered on one webpage and the associated password is entered on another page, for added security. Other elements and inputs may exist on the webpage and other steps can be used to gather the password for use in the present invention, without departing from the novel scope thereof. For example, the password entry elements may be part of a popup dialog requesting entry of appropriate data to proceed.

The use of the SSL or TLS protocols protects user-name/password-message 288 from being electronically viewed by a third party while it is in transit on network 110. However, in the present state of security systems, passwords can still be discovered by others, including bad actors, using methods such as key-logging, phishing and brute force guessing, among others and as are known by persons having ordinary skill in the art.

It may be useful here, to provide some background into the above terms. In the act of stealing passwords by bad actors, currently, "key-logging" is the process of collecting keystroke information for deciphering by malware (also known as spyware or computer viruses) that has been surreptitiously previously installed on a computer. Such malware is used to track, collect and report remotely, every keystroke, regardless of the context of the keystroke to the bad actor. These keystrokes can then later be sifted for sensitive information, such as passwords, credit card numbers, social security numbers and other sensitive and valuable data.

"Phishing" is a term used to describe the process of fooling a computer user into disclosing confidential information, such as a user name and password. Someone, such as a bad actor, sets up a look-a-like website that appears convincingly like the desired legitimate website, for instance by including such visual elements as icons 203 and text 204 found on the legitimate website. One scheme, of many, for luring users to the second website is to send an e-mail to a user containing an enticing or ominous sounding message, which may cause the receiver of the email to want to check an account at the legitimate web site. Within that e-mail is a link that the user believes will lead to the legitimate web site; however, once clicked-on causes the browser to display the false webpage, that looks convincingly like login webpage of the legitimate site. If the user does not notice that the webpage URL is not the URL for the legitimate server, the user will enter his user-name 104 and password 105. Referring to FIG. 2B, a listing of the HTML that produced login-webpage 113 is shown. As will be seen, line 253 of the listing contains submission-URL 263. Submission-URL 263 is not immediately visible on login-webpage 113, and is typically only displayed by browser-program 106 when user 100 hovers mouse-cursor 201 over login-button 208. By replacing submission-URL 263 with the URL of a different website, for example the false website, causes login-button 208 to sends the presumably legitimate user name and password information to the second website server. Someone who is not user 100 can thereafter use user-name 104 and password 105 to impersonate user 100 and access legitimate server 112.

Another method of discovering passwords is to guess them; this can be done by knowing something about the user, by luck and/or by brute force, as will be explained in detail below. In order to submit a guess to server 112, a computer (similar to computer 101) typically only needs to create an instance of user-name/password-message 288 and send the created instance of user-name/password-message 288 to URL 263. Such a computer can be used to submit iteration after iteration of user-name/password-messages 288, each containing a new guess of password 105, until server 112 produces secure-webpage 115. The guessed password strings can be based on random guesses or can be based on social information associated with user 100, such as names, birthdays, addresses, etc. that are often available on more public websites, such as Facebook® and Myspace® among others. Oftentimes user 100 chooses password 105 poorly. It is widely known that the most common PIN in use is "1111". Other guesses might be based on factory default values or common words (such as "0000", "admin" and "password").

It is well known that there are numerous schemes for discovering a user name and a password. Regardless of the means of discovery, once a user name and a password have been discovered, someone, including a bad actor, is able to impersonate the user, potentially from any computer anywhere in the world.

In the ordinary course of the use of the Internet, a user might access a plurality of server. Typically a user doesn't want to or simply can't remember myriad different password. It is not untypical, therefore, for a user to use one text string for a plurality of passwords in order to access a plurality of servers. Therefore, once the user's password is discovered, someone, including a bad actor, can often then access a plurality of servers.

It will be understood that one of the goals of the present invention is to make it more difficult for someone to discover a user's password. Another goal is to make it more difficult for someone to impersonate a user after a password has been discovered. Other goals of the present invention will become apparent as the description progresses.

Figure 1B:
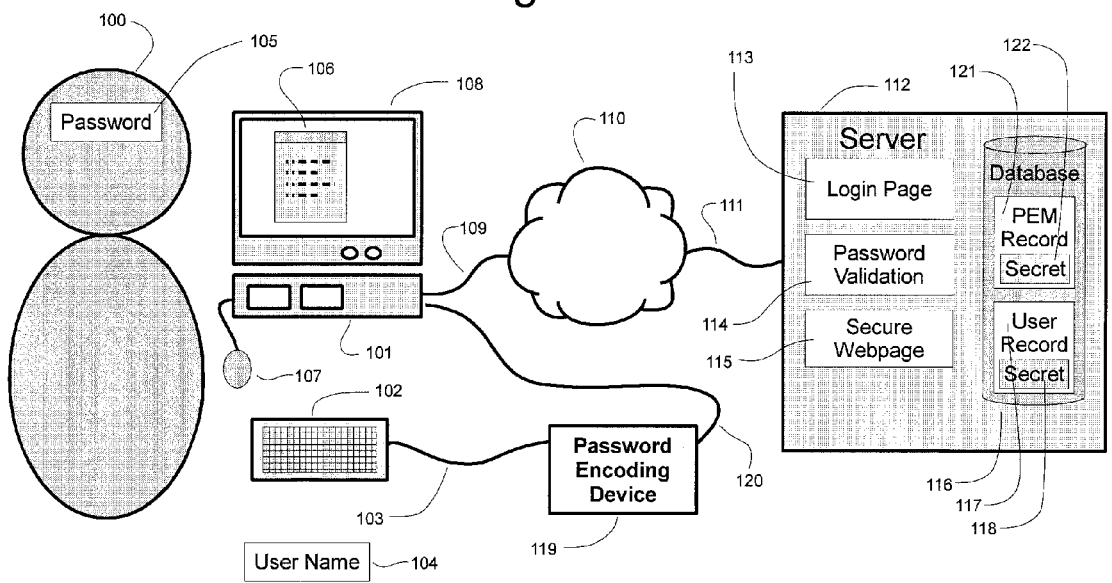

Referring again to the Figures, FIG. 1B shows an embodiment of the present invention wherein a password-encoding-device 119 is connected to keyboard 102 and computer 101. As will be seen, keyboard-cable 103 which is typically directly connected to the CPU of the computer, is here unplugged from computer 101 and plugged into password-encoding device 119; such that keystrokes generated on keyboard 102 are directed to password-encoding device 119. Password-encoding-device 119 is then plugged into computer 101 via additional-cable 120. In this embodiment, password-encoding-device 119 contains a password-encoding-module 300 (which is described in more detail with reference to FIG. 3 below).

As will be described in more detail in the following discussion, in normal operations, password-encoding-device 119 is electronically transparent in usage. Keystrokes entered on keyboard 102 are received by password-encoding-device 119 and are sent to computer 101 almost instantaneously. Similarly, any commands sent by computer 101 to keyboard 102, for example, commands to activate or deactivate the "caps-lock" light (not shown) are received by password-encoding-device 119 and transmitted unaltered to keyboard 102. While keyboard 102, computer 101 and password-encoding-device 119 are shown connected using wired connections, it will be understood that various wireless protocols can be utilized for these connections without departing from the novel scope of the present invention.

Figure 3A:
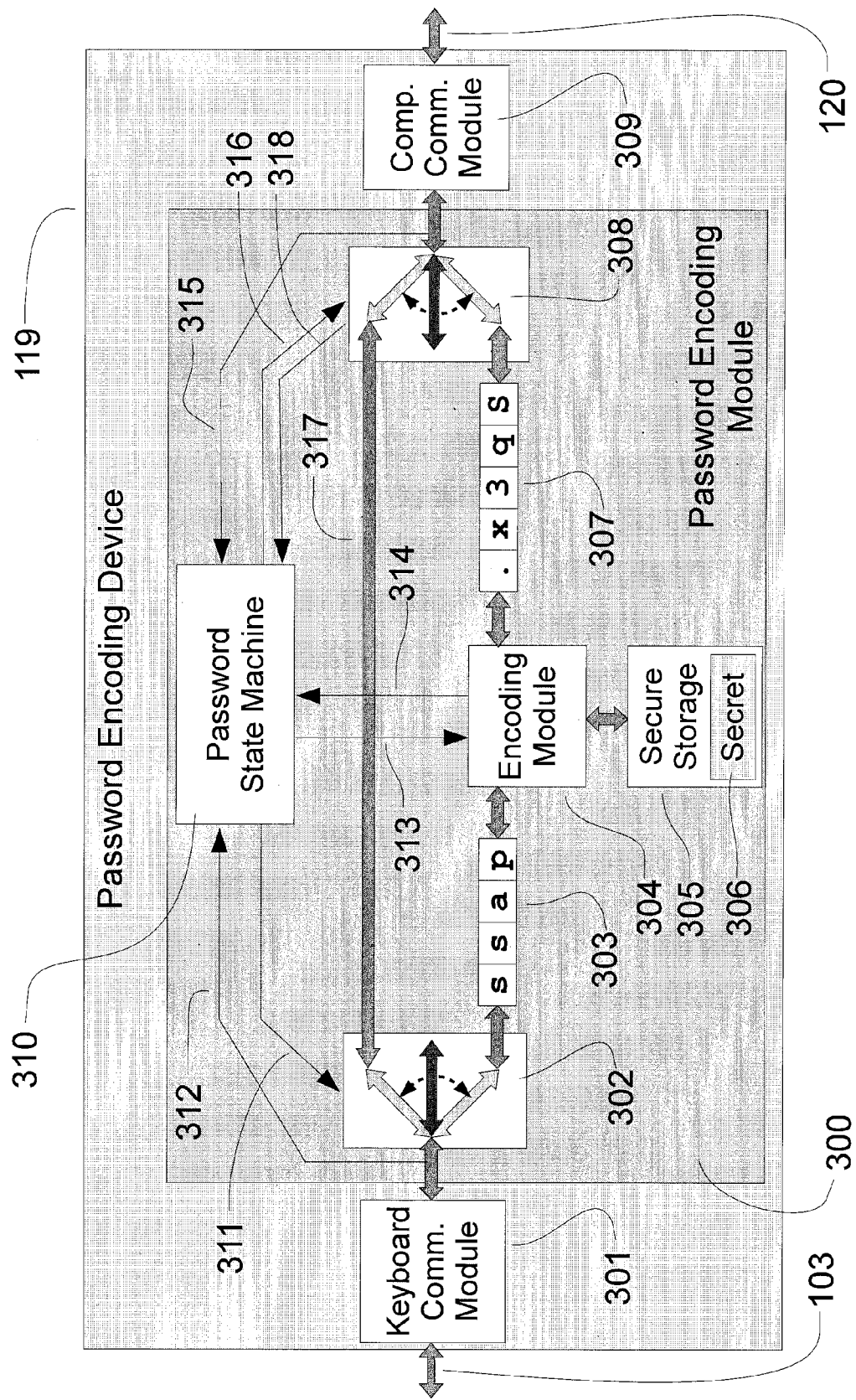
FIGS. 3A, 3B and 3C are schematic representations of the components of one embodiment of a password-encoding module (PEM), its internal states and modifications to the login process.
Figure 3B:
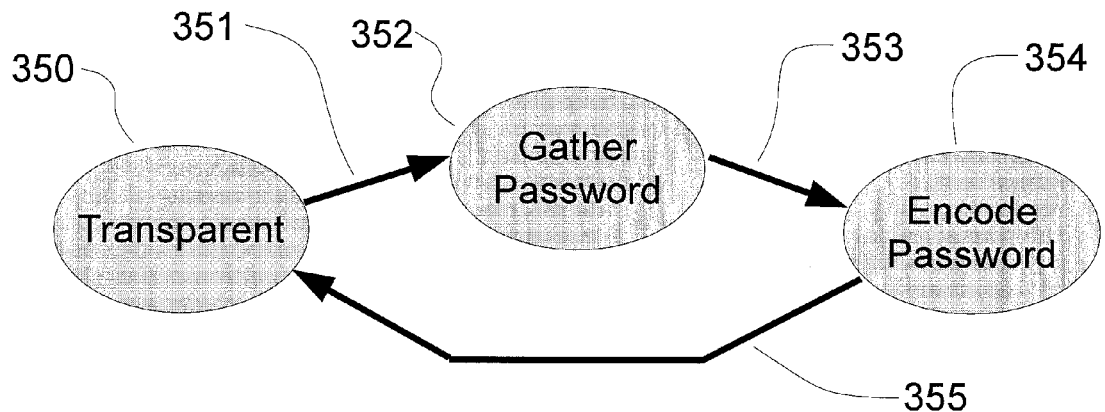

Referring now to FIGS. 3A and 3B, it will be seen that FIG. 3A shows a one embodiment of the internal components of password-encoding-device 119 of the present invention and FIG. 3B shows one embodiment of the internal states of password-state-machine 310. As shown in FIG. 3A, password-encoding-device 119 is connected to keyboard 102 via keyboard-cable 103 and communicates with keyboard 102 using keyboard-communication-module 301. The device, as shown, is connected to computer 101 via additional-cable 120. It will be seen that password-encoding-device 119 communicates with computer 101 using computer-communication-module 309 and that it further contains password-encoding-module (PEM) 300, the operation and data flow of which are controlled by a password-state-machine 310. As shown in FIG. 3B, in the use of the password-state-machine 310 three states exist and can be used: a transparent-state 350, a gather-password-state 352 and an encode-password-state 354; the operations performed in each state are described in further detail below. It will be seen that PEM 300 comprises a keyboard-communication-module 301, an inbound-data-flow-switch 302, plaintext-password-buffer 303, an outbound-data-flow-switch 308 and computer-communication-module 309. It will be understood that while these devices are shown schematically, persons having ordinary skill in the art will be able to fashion effective devices, or software or alternative devices that can act in the manner described without departing from the novel scope of the present invention.

Referring again to the drawings, it will be seen that the password-state-machine 310 observes keyboard-input 312, computer-command-input 315 and encoding-module-status 314 and outbound-data-status 318. Password-state-machine 310 produces inbound-data-flow-control 311, outbound-data-flow-control 316, and encoding-module-control 313. It will be understood that following a reset of the system or after errors, a fresh power-up, or other reboot or beginning events, password-state-machine 310 begins again in a transparent-state 350, which is the default state. When password-state-machine 310 is in transparent-state 350, inbound-data-flow-control 311 causes inbound-data-flow-switch 302 to connect keyboard-communication-module 301 to transparent-data-channel 317 (graphically, the "up" position in inbound-data-flow-switch 302). Outbound-data-flow-control 316 causes outbound-data-flow-switch 308 to connect transparent-data-channel 317 to computer-communication-module 309 (graphically, the "up" position in outbound-data-flow-switch 308). In this configuration, incoming keystroke messages are transferred from keyboard-communication-module 301 to transparent-data-channel 317 to computer-communication-module 309. Computer-communication-module 309 transfers the keystroke messages to computer 101. The keystroke messages are unchanged during the transfers, such that computer 101 receives the keystroke messages from keyboard 102 unaltered.

In a preferred embodiment of the present invention, computer-communication-module 309 receives a command message from computer 101, computer-command-input 315 cause password-state-machine 310 to effect start-gather-password-transition 351, which causes password-state-machine 310 to enter gather-password-state 352. In some embodiments, start-gather-password-transition 351 is triggered by keyboard-input 312. Persons with skill in the art will understand that other means of triggering start-gather-password-transition 351 can be implemented without departing from the novel scope of the present invention, for example by pressing a button (not shown) but provided on certain embodiments of password-encoding-device 119.

In the gather-password-state 352, inbound-data-flow-control 311 causes inbound-data-flow-switch 302 to connect keyboard-communication-module 301 to plaintext-password-buffer 303 (graphically, the "down" position for inbound-data-flow-switch 302). In this configuration, inbound keystroke messages received by keyboard-communication-module 301 are transferred and stored in plaintext-password-buffer 303. User 100 can now type a password 105 and the keystrokes or characters representing the password 105 are stored in plaintext-password-buffer 303.

In a preferred embodiment, keyboard-input 312 triggers start-encoding-password-transition 353, which causes password-state-machine 310 to enter the encode-password-state 354. Start-encoding-password-transition 353 is triggered when a keystroke message contains a "tab" or "enter" keystroke (produced by keyboard 102 when user 100 operates tab-key 905 or enter-key 906, as shown in FIG. 9A). In other embodiments, start-encoding-password-transition 353 is triggered by computer-command-input 315. In many embodiments, start-encoding-password-transition 353 can be triggered by either keyboard-input 312 or computer-command-input 315.

In encode-password-state 354, password-state-machine 310 activates encoding-module 304 using encoding-module-control 313; encoding-module 304 then retrieves the keystrokes or characters from plaintext-password-buffer 303, which is presumed to contain a plaintext representation of user 100's password 105. Encoding-module 304 also retrieves cryptographic-secret 306 from secure-storage 305. Using these inputs, encoding-module 304 builds encoded-password-packet-string 416 (a process that will be described in more detail below), which it stores in encoded-password-packet-buffer 307. When it has finished the encoding process, encoding-module 304 uses encoding-module-status 314 to inform password-state-machine 310 that the encoding password packet is complete.

In encoding-password-state 354, the system causes outbound-data-flow-control 316 to tell outbound-data-flow-switch 308 to transfer the contents of encoded-password-packet-buffer 307 to computer-communication-module 309. Outbound-data-flow-switch 308 connects encoded-password-packet-buffer 307 to computer-communication-module 309 (graphically, the "down" position for outbound-data-flow-switch 308). In a preferred embodiment, computer-communication-module 309 is able to translate the contents of encoded-password-packet-buffer 307 into keystroke messages so that computer-communication-module 309 is able to transfer the contents of encoded-password-packet-buffer 307 to computer 101 as if the contents of encoded-password-packet-buffer 307 had been typed by user 100.

When encoded-password-packet-buffer 307 is empty, outbound-data-flow-switch 308 activates outbound-data-status 318 to inform password-state-machine 310 that it has completed the transfer. Password-state-machine 310 uses a combination of encoding-module-status 314 and outbound-data-status 318 to trigger encoding-complete-transition 355, which causes password-state-machine 310 to return to transparent-state 350. As above, in transparent-state 350, inbound-data-flow-switch 302 and outbound-data-flow-switch 308 connect keyboard-communication-module 301 to computer-communication-module 309 so that keystroke messages are transferred unaltered from keyboard 102 to computer 101.

Persons having ordinary skill in the art will recognize that this discussion is for explanatory purposes only and should not be considered limiting. The details of the states, the signals, the data handling and data processing elements can be implemented using numerous techniques without departing from the novel scope of the present invention. Some embodiments add additional elements and actions: for example, in password-gather-state 352, elements not shown cause computer-communication-module 309 to transmit an asterisk "*" character to computer 101 whenever keyboard-communication-module 301 receives a keystroke. The asterisk characters provide user 100 with visual feedback while password 105 is being typed, without exposing the plaintext password to eavesdropping, either electronic or visual. Other elements that are not shown here cause keystrokes to be removed from plaintext-password-buffer 303 when a keystroke message contains a backspace character. In some embodiments, particular keys or key combinations might clear the password buffer to allow the user to start over, similar to the way the Ctrl-U character clears the command line in some UNIX console programs.

To further protect the password authentication process, server 112 and PEM 300 implement a challenge/response protocol. Referring to FIG. 2B, server 112 has embedded challenge data into login-webpage 113 by adding challenge-data-text 264 to password-input-line 258. The importance of this field will become apparent in the discussion below.

Figure 3C:
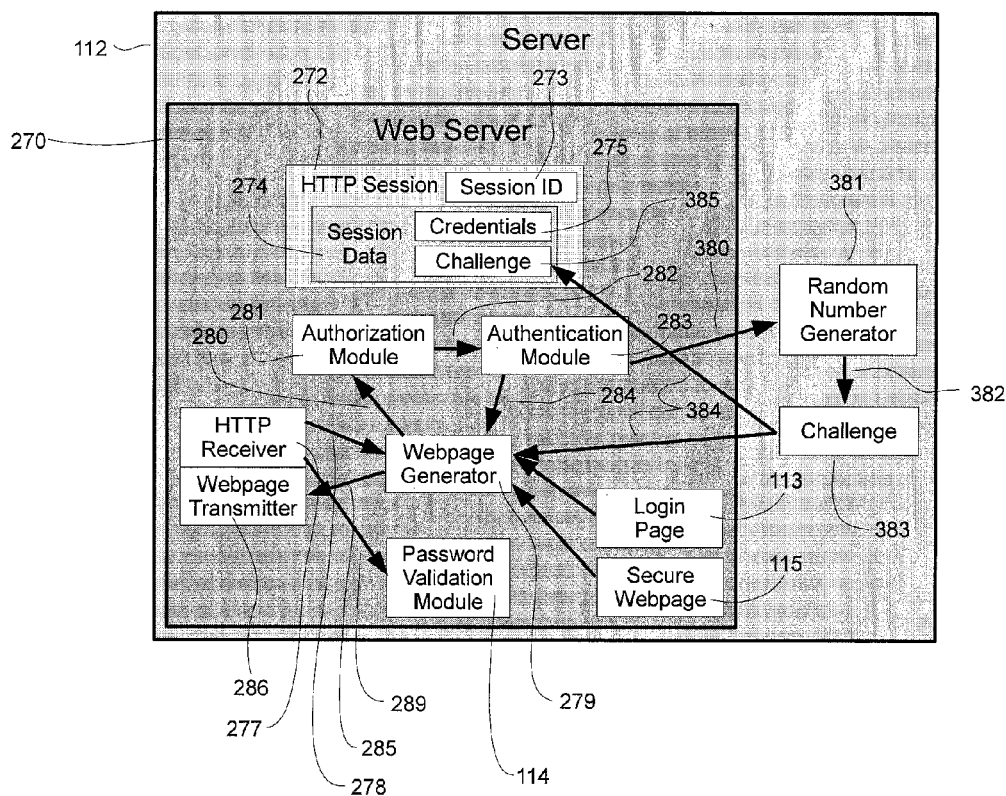

FIG. 3C shows modifications to FIG. 2C that implement one embodiment of the challenge/response protocol. Referring to FIG. 3C, the login process proceeds as described in FIG. 2C until request-authentication-message 282 is received by authentication-module 283. In response to request-authentication-message 282, authentication-module 283 sends a request-fresh-challenge-message, as indicated by arrow 380, to random-number-generator 381. Random-number-generator 381, of any type known to persons with ordinary skill in the art, generates a sequence of apparently random numbers. A request for a random number causes random-number-generator 381 to produce the next value in that sequence, represented by arrow 382, which is converted into original-challenge-data 383: challenge-data-message, as indicated by arrows 384, cause original-challenge-data 383 to be transferred to webpage-generator 279 and stored in stored-challenge-data 385 within session-data 274. Now, when webpage-generator 279 produces login-page-HTML 249, webpage-generator 279 creates challenge-data-text 264 based on original-challenge-data 383. The purpose of original-challenge-data 383, challenge-data-text 264 and stored-challenge-data 385 will become clear when the internal operations of PEM 300 and password-validation-module 114 are further disclosed below.

Figure 4:
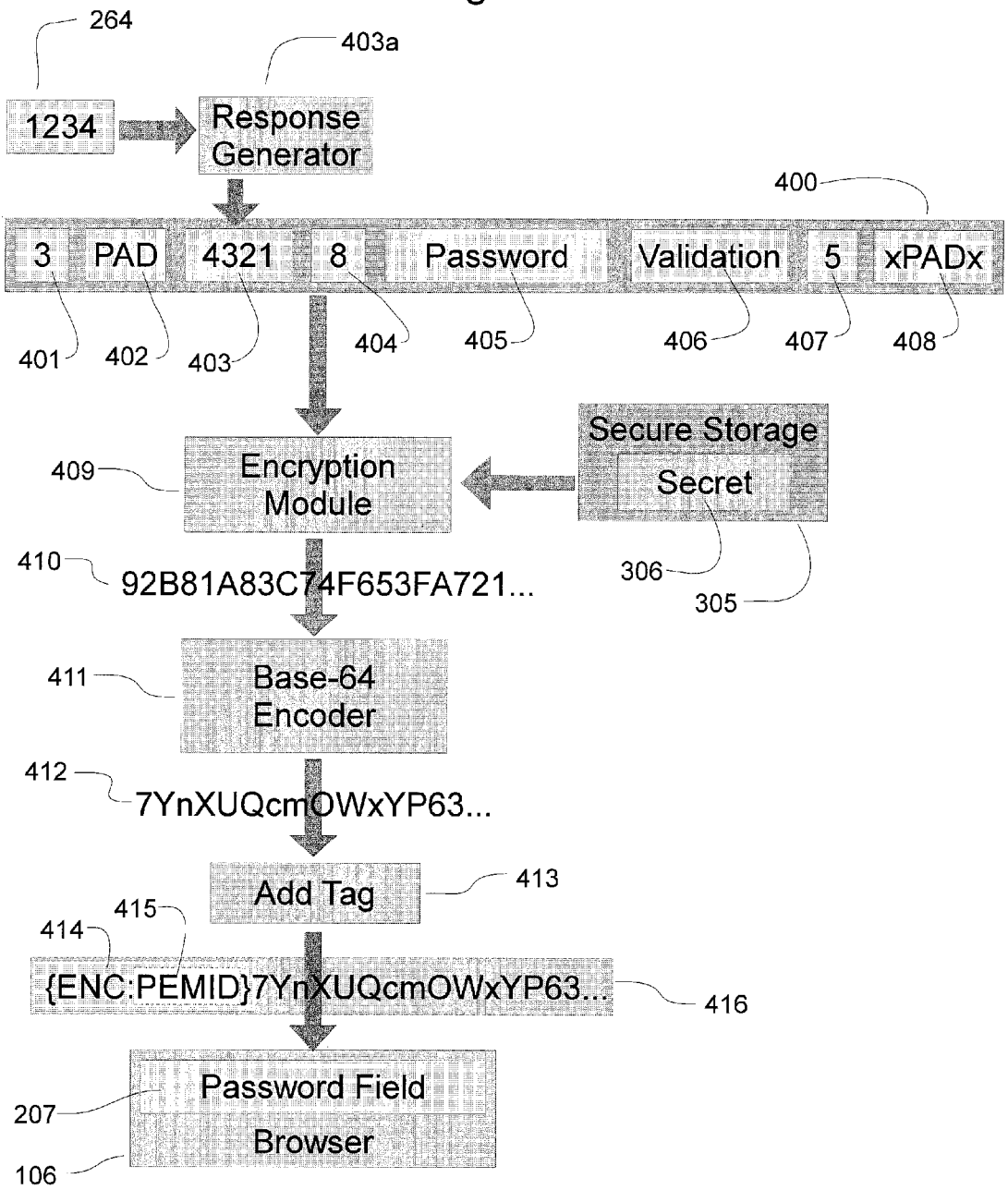
FIG. 4 is a schematic representation of the data and processing steps performed by the PEM to create an encoded password packet in a preferred embodiment of the present invention.

Referring now to FIG. 4, a more detail description of the steps taken when password-state-machine 310 enters encode-password-state 354 is shown. It will be understood that the steps and format presented here are explanatory and should not be considered limiting. The first step in the encoding process is to assemble plaintext-password-packet 400. In this example, plaintext-password-packet 400 consist of the following: length-of-first-padding-bytes 401, first-padding-bytes 402, response-bytes 403, length-of-password-bytes 404, password-bytes 405, validation-bytes 406, length-of-second-padding-bytes 407 and second-padding-bytes 408. Length-of-first-padding-bytes 401 encodes the number of bytes found in first-padding-bytes 402; similarly, length-of-second-padding-bytes 407 encodes the number of bytes found in second-padding-bytes 408. These fields are optional with respect to the novel scope of the present invention, but persons with ordinary skill in the art will recognize that padding is often used to protect the integrity of many cryptographic algorithms. First-padding-bytes 402 and second-padding-bytes 408 each contain a random number of random bytes.

Response-bytes 403 are generated by passing challenge-data-text 264 through response-generator 403*a* using a known algorithm. Persons with ordinary skill in the art will recognize that there are many appropriate challenge/response schemes. The example scheme shown in FIG. 4 is a byte-reversal of challenge-data-text 264. The length-of-password-bytes 404 encodes the number of bytes in password-bytes 405. Password-bytes 405 contains bytes representing characters appropriate for the keystrokes stored in plaintext-password-buffer 303. It is presumed in this example that plaintext-password-buffer 303 contains keystrokes or character that represent password 105.

Figure 6A:
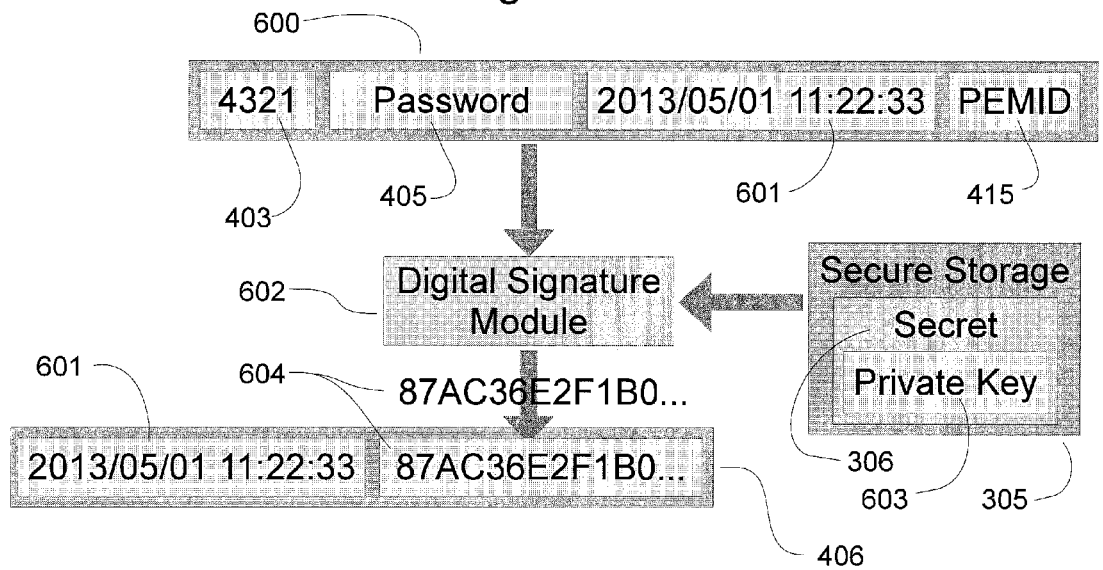
FIGS. 6A and 6B are schematic representations of further data and processing steps taken by the PEM and the server to validate the encoded password packet.
Figure 6B:
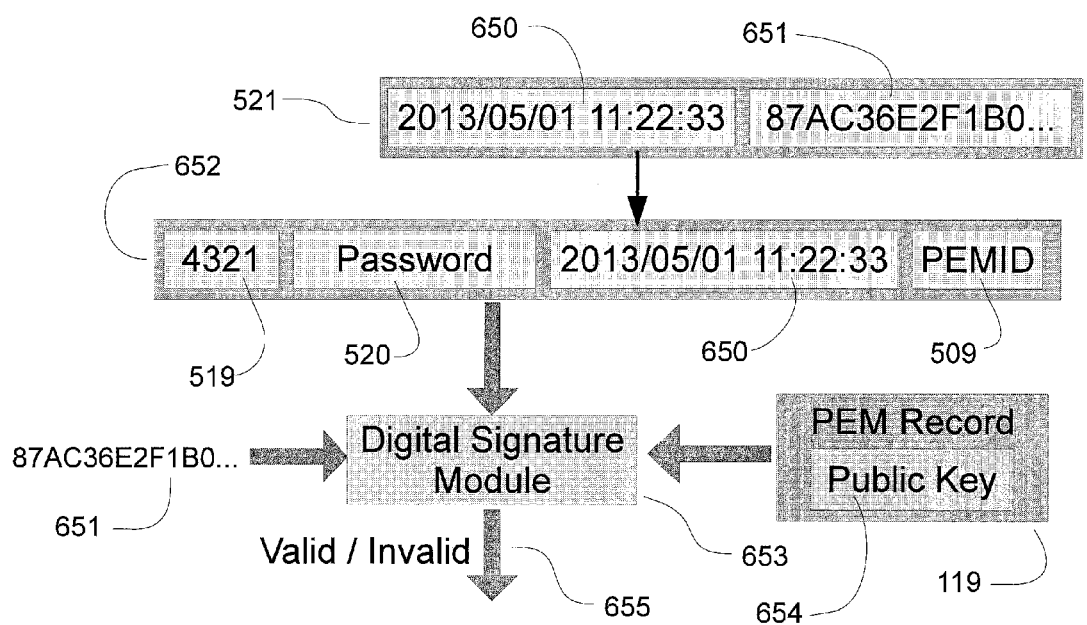

Some embodiments of the present invention can include validation-bytes 406 that contain data that provides additional validation of the authenticity and origin of plaintext-password-packet 400. In some embodiments, validation-bytes 406 contain a digital signature created by passing response-bytes 403 and password-bytes 405 through a digital signature algorithm (a validation scheme is shown in FIGS. 6A and 6B and is further described below). Persons with ordinary skill in the art will understand how digital signatures are generated and validated and will recognize that other types of validation can be used without departing from the novel scope of this invention. In some embodiments, validation-bytes 406 contain the serial number of the embodiment of PEM 300. In some embodiments, validation-bytes 406 contain bytes representing the time that PEM 300 entered password-encoding-state 354. It will be understood that inclusion of validation-bytes 406 in plaintext-password-packet 400 is an additional step, the non-inclusion of which is does not remove the embodiment from the novel scope of the present invention. One embodiment of a validation scheme is shown in FIG. 6 and will be further discussed below.

Still referring to FIG. 4, plaintext-password-packet 400 is passed to encryption-module 409. Encryption-module 409 retrieves cryptographic-secret 306 from secure-storage 305. Encryption-module 409 uses an encryption algorithm to produce encrypted-password-packet-bytes 410. Persons with ordinary skill in the art will know that a non-limiting list of examples of encryption algorithm includes AES, DES and triple DES.

The HTTP protocol prefers to transfer ASCII characters; and encrypted-password-packet-bytes 410 might contain bytes that might be misinterpreted by the HTTP protocol during transmission. Therefore, FIG. 4 also shows that encrypted-password-packet-bytes 410 are passed through base-64-encoder 411. Base-64-encoder 411 converts encrypted-password-packet-bytes 410 into base-64-password-packet-string 412. Persons with ordinary skill in the art will recognize that base-64 encoding is a ubiquitous Internet standard; however, other manner of encodings can be used without departing from the novel scope of the present invention.

In the present example embodiment, tagging-module 413 prepends base-64-password-packet-string 412 with encoding-tag 414 resulting in encoded-password-packet-string 416. In this example, encoding-tag 414 comprises specific text elements (i.e. the "{ENC" and "}" shown in FIG. 4) and a PEM-ID-string 415 (i.e. the "PEMID" shown in FIG. 4). Encoding-module 304 places encoded-password-packet-string 416 in encoded-password-packet-buffer 307 (a step not shown in FIG. 4) and computer-communication-module 309 transfers encoded-password-packet-string 416 to password-input-field 207 in browser-program 106.

Persons with ordinary skill in the art will recognize the need for PEM 300's ID to be unique among a plurality of PEM 300s and that in some embodiments, PEM-ID-string 415 is a GUID (Globally Unique ID), unique among all PEM 300s in the world. In a preferred embodiment, the GUID is created and programmed into each PEM 300 when it is manufactured. In some embodiments, PEM ID is part of PEM certificate that wraps PEM-public-key 1119 (shown in FIG. 11) and in other embodiments server 112 creates its own list of unique identifiers (UIDs), unique across PEM 300s that are registered with server 112. Additional steps in the key exchange process shown in FIG. 11 might be used to transmit the UID to PEM 300, perhaps, in some embodiments, as part of server-key-information-message 1124 (shown in FIG. 11). In some embodiments, PEM 300 stores the UID with cryptographic-secret 306.

Figure 5:
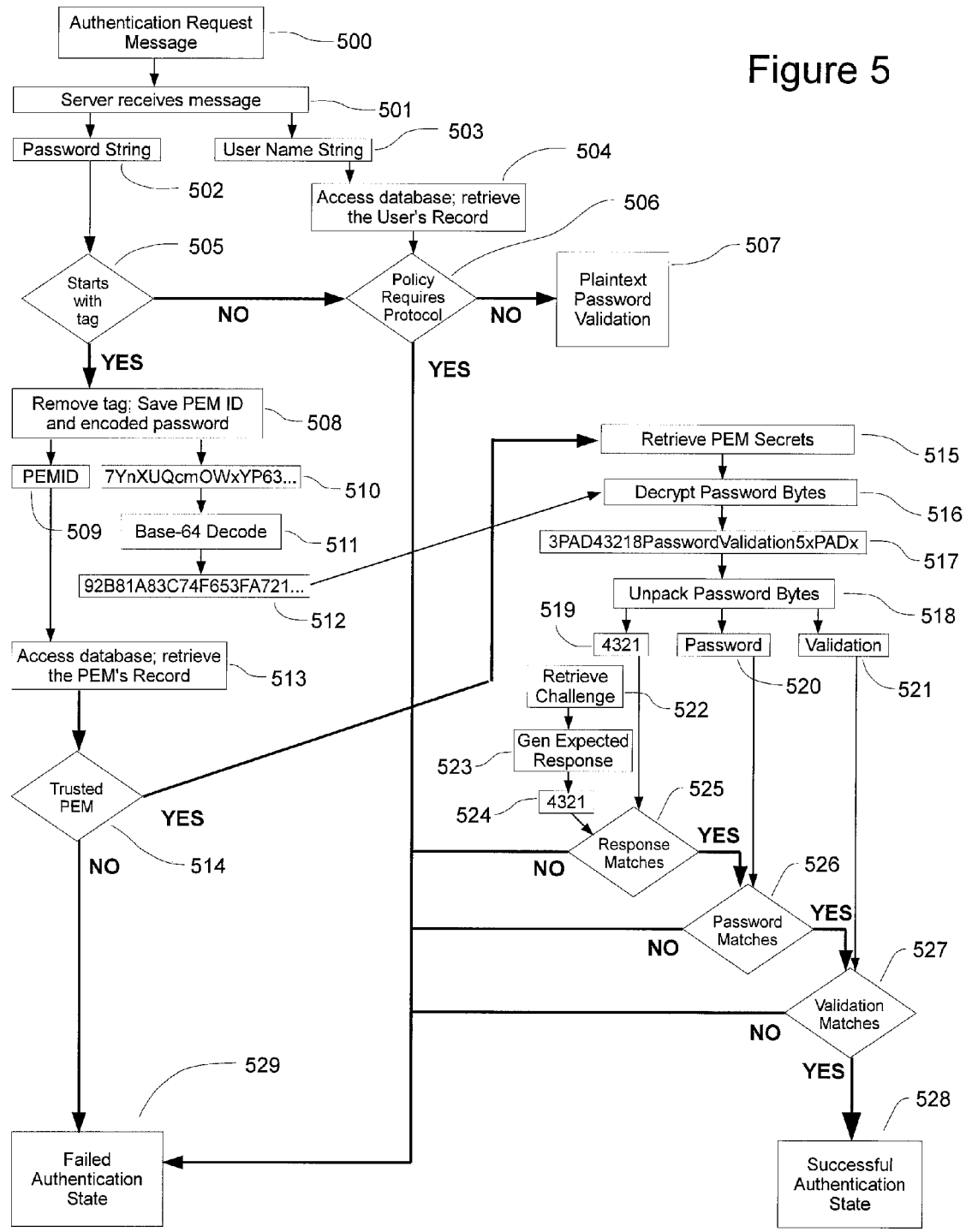
FIG. 5 is a schematic representation of the data and processing performed by a server to validate an encoded password packet.

In FIG. 5, password-validation-module 114 essentially reverses the steps performed by encoding-module 304 shown in FIG. 4; where data elements are recreated by the process described in FIG. 5. It will be understood that the steps perform by password-validation-module 114 are determined by the steps performed by a particular embodiment of encoding-module 304 and, further, the steps performed by password-validation-module 112 can be reordered and/or modified without departing from the novel scope of this invention.

Referring again to FIG. 5, in receive-message-step 501, server 112 receives authentication-request-message 500. In some embodiments, authentication-request-message 500 uses standard Internet server programs and protocols such as HTTP, known to persons having ordinary skill in the art, and similar to user-name/password-message 288. It will be understood that other protocols, such as a remote procedure call protocol, can be utilized by authentication-request-message 500 and receive-message-step 501 with departing from the novel scope of the present invention. In receive-message-step 501, server 112 extracts parameters received-password-packet-string 502 and received-user-name-string 503. In the example process, received-user-name-string 503 is a copy of the text entered in user-name-field 206 and is presumed to represent user-name 104. In the example process, received-password-packet-string 502 is a copy of the text entered in password-input-field 207, which is a copy of encoded-password-packet-string 416.

In retrieve-user-record-step 504, password-validation-module 114 uses received-user-name-string 503 to retrieve user-record 117 in database 116. A database or database program is used here to store and retrieve data. User-record 117 comprises user-secret-data 118 as well as other information needed to validate received-password-packet-string 502. In some embodiments, user-record 117 also includes information for implementing authentication policies, such as, associations between received-user-name-string 503 and particular embodiments of PEM 300, whether ordinary passwords are acceptable, as well as other authentication and authorization information as known to persons having ordinary skill in the art.

Continuing in FIG. 5, in encoding-tag-decision 505, password-validation-module 114 examines received-password-packet-string 502 to see if it contains a copy of encoding-tag 414. If a copy of encoding-tag 414 is not present, password-validation-module 114 decides that received-password-packet-string 502 represents an ordinary, plaintext password and proceeds to plaintext-allowed-decision 506. In plaintext-allowed-decision 506, password-validation-module 114 checks user-record 117 to see whether or not an encoded password authentication is required. If the policy stored in user-record 117 does not require encoded password authentication, plaintext-allowed-decision 506 proceeds to plaintext-password-validation module 507. However, if the policy stored in user-record 117 requires encoded password authentication, plaintext-allowed-decision 506 proceeds to the failed-authentication-state 529. In some embodiments, the authentication policy stored in user-record 117 requires that once user-record 117 has been associated with an embodiment of PEM 300, all subsequent authentication attempts must use encoded passwords. In some embodiments, all authentication attempts must use encoded passwords, so plaintext-allowed-decision 506 always proceeds to failed-authentication-state 529. In many embodiments, entering failed-authentication-state 529 causes webpage-generator 279 to produce and transmit a login-failed webpage with appropriate error messages (not shown but known to person with ordinary skill in the art) to browser-program 106. In each case, the manner of authentication is subject to the rules as determined by the programmer or the end user as desired, without departing from the novel scope of the present invention.

If in encoding-tag-decision 505, password-validation-module 114 recognizes that received-password-packet-string 502 contains a copy of encoding-tag 414, password-validation-module 114 proceeds to password-string-parsing-step 508. As shown in FIG. 5, password-string-parsing-step 508 parses received-password-packet-string 502 to recover received-PEM-ID-string 509 and received-base-64-password-packet-string 510. In many embodiments possible in the present invention, received-PEM-ID-string 509 is a copy of PEM-ID-string 415. In the present example process, received-base-64-password-packet-string 510 is a copy of base-64-password-packet-string 412. (Not shown for simplicity, if password-validation-module 114 discovers that encoded-password-packet-string 502 does not match the expected format, the operation fails and password-validation-module 114 proceeds to the failed-authentication state 529.)

In base-64-decode-step 511, received-base-64-password-packet-string 510 is decoded by base-64-decode-step 511 into received-array-of-bytes 512 using techniques known to person with ordinary skill in the art. In the example process, received-array-of-bytes 512 is a copy of encrypted-password-packet-string 410. (Not shown for simplicity, invalid characters within base-64-password-packet-string 510, or other failure of base-64-decode-step 511 to produce a valid received-array-of-bytes 512, cause password-validation-module 114 to proceed to failed-authentication-state 529.)

In the present example process, in the retrieve-PEM-record-step 513, password-validation-module 114 accesses database 116 to retrieve PEM-record 121 associated with received-PEM-ID-string 509. In trusted-PEM-decision 514, password-validation-module 114 determines if PEM-record 121 is associated with a trusted instance of PEM 300. Persons with ordinary skill in the art will recognize that there are numerous ways of cataloging trusted and untrusted instances of received-PEM-ID-string 509s, any or all of which can be used without departing from the novel scope of this invention. In most embodiments, if database 116 does not contain an instance of PEM-record 121 associated with received-PEM-ID-string 509, trusted-PEM-decision 514 proceeds to failed-authentication-state 529. In many embodiments, trusted-PEM-decision 514 determines if it will allow the authentication to proceed based on one or more of the following parameters: received-PEM-ID-string 509 is associated with user-record 117, received-PEM-ID-string 509 is not in a database of untrustworthy PEM ID strings, PEM-record 121 contains appropriate PEM-secret-data 122, received-PEM-ID-string 509 has not been associated with an excessive number of failed login attempts, received-PEM-ID-string 509 has not been associated with an excessive number of login attempts over some period of time. Persons having ordinary skill in the art will recognize that there are many factors either necessary or optional for the implementation of this trusted-PEM-decision 514. In most embodiments, failure to trust received-PEM-ID-string 509 causes trusted-PEM-decision to proceed to failed-authentication-state 529.

If trusted-PEM-decision 514 determines that received-PEM-ID-string 509 and PEM-record 121 allow authentication, trusted-PEM-decision 514 proceeds to retrieve-PEM-secret-step 515. In retrieve-PEM-secret-step 515 password-validation-module 114 accesses PEM-record 121 to retrieve PEM-secret-data 122. It will be understood that if PEM-record 121 does not contain appropriate PEM-secret-data 122, password-validation-module 114 proceeds to the failed-authentication-state 529.

In decryption-step 516, password-validation-module 114 uses PEM-secret-122 to decrypt received-array-of-bytes 512, which results in received-plaintext-packet-bytes 517. In the example process, received-plaintext-packet-bytes 517 is equivalent to plaintext-password-packet 400. It will be understood that decryption errors or other failures of decryption-step 516 to produce a valid byte array cause password-validation-module 114 to proceed to the failed-authentication-state 529.

In unpacking-step 518, received-plaintext-packet-bytes 517 is parsed to recover the received-response-bytes 519, received-password-bytes 520 and (optionally) received-validation-bytes 521. In the exemplary process, received-response-bytes 519 is a copy of response-bytes 403, received-password-bytes 520 is a copy of password-bytes 405, and received-validation-bytes 521 is a copy of validation-bytes 406. It will be understood that any parsing error or any other failure of unpacking-step 518 to produce a valid received-response-bytes 519, received-password-bytes 520 or received-validation-bytes 521 causes password-validation-module 114 to proceed to the failed-authentication-state 529.

In retrieve-challenge-step 522, password-validation-module 114 retrieves stored-challenge-data 385. In many embodiments where network 110 include the Internet, password-validation-module 114 uses standard Internet techniques (such as cookies and HTTPS session ID), known to persons with ordinary skill in the art, to retrieve stored-challenge-data 385 from session-data 274. In other embodiments, for instance when the protocol used during receive-message-step 501 is a form of remote-procedure-call, retrieve-challenge-step 522 might extract challenge data from authentication-request-message 500. It will be understood that failure of retrieve-challenge-step 522 to produce valid challenge data causes password-validation-module 114 to proceed to failed-authentication-state 529.

Referring to FIG. 5, generate-expected-response-step 523 transforms stored-challenge-data 305 into expected-response 524. The transformation performed by generate-expected-response-step 523 is similar to the transformation performed by response-generator 403*a*. In the example process, generate-expected-response-step 523 produces a byte-reversed copy of stored-challenge-bytes 305. Persons having ordinary skill in the art will recognize that there are myriad challenge/response algorithms that can be implemented in different embodiments.

In response-matches-decision 525, password-validation-module 114 determines if the received-response-bytes 519 match the expected-response-bytes 524. If received-response-bytes 519 does not match the expected-response-bytes 524, the password-validation-module 114 proceeds to the failed-authentication-state 529. If received-responsebyte 519 is appropriate for expected-response-bytes 524, password-validation-module 114 proceeds to password-matches-decision 526.

In password-matches-decision 526, password-validation-module 114 uses data stored in user-record 117 (which includes user-secret-data 118; user-record 117 is retrieved during retrieve-user-record-step 504) to determine if received-password-bytes 520 are valid. In the embodiment shown in FIG. 4 and FIG. 5, received-password-bytes 520 are a plaintext copy of password 105. Other encodings of user 100's password are possible and will be discussed below. If received-password-bytes 520 are appropriate for password data stored in user-record 117, the password-validation-module 114 proceeds (optionally) to validation-data-matches-decision 527. If received-password-bytes 520 are not appropriate for password data stored in user-record 117, password-validation-module 114 proceeds to the failed-authentication-state 529.

It will be understood that further validation of received-password-packet-string 502 is optionally made without departing from the novel scope of the present invention. In some embodiments, received-validation-bytes 521 are not transmitted, decoded or examined, in which case validation-matches-decision 527 always proceeds to successful-authentication-state 528. In many embodiments, validation-matches-decision 527, password-validation-module 114 uses data stored in PEM-record 121 (includes PEM-secret-data 122; PEM-record 121 is retrieved during retrieve-PEM-record step 513) to determine if received-validation-bytes 521 are valid.

In some embodiments, received-validation-bytes 521 contain a digital signature, generated and validated in a manner known to persons having ordinary skill in the art. In some embodiments, received-validation-bytes 521 contain the serial number of PEM 300. Validation-matches-decision 527 succeeds if the serial number of PEM 300 matches data in PEM-record 121. In some embodiments, validation-bytes 406 contain bytes representing the time that PEM 300 entered password-encoding-state 354. Validation-matches-decision 527 succeeds if the difference between the time in received-validation-bytes 521 and the time based on the server's internal clock (not shown) is less than a preset time interval.

Persons with ordinary skill in the art will recognize that the inclusion of validation-bytes 406 in plaintext-password-packet 400 is not required to remain without departing from the novel scope of this invention. An example of a validation scheme will be further described below. Person with ordinary skill in the art will recognize that other types of validation can be used without departing from the novel scope of this invention.

If received-validation-bytes 520 are appropriate for PEM-record 121, PEM-secret-data 122 and received-plaintext-password-packet-bytes 517, the password-validation-module 114 proceeds to successful-authentication-state 528. If received-validation-bytes 521 are not appropriate for PEM-record 121, PEM-secret-data 122 and received-plaintext-password-packet-bytes 517, password-validation-module 114 proceeds to failed-authentication-state 529.

It will be understood that the order of the steps performed by password-validation-module 114 can be reordered or changed without changing the password validation process and that the steps performed by password-validation-module 114 are determined by the steps taken by PEM 300 to encrypt, encode or digitally sign the password packet, and that the present example only contains one of many possible embodiments.

FIG. 6 shows one possible embodiment of a validation scheme. It will be understood that FIG. 6 is a supplement to FIGS. 4 and 5. FIG. 6A shows the additional data and processing steps performed by PEM 300 to produce validation-bytes 406. Digital-signature-input-bytes 600 are assembled from response-bytes 403, password-bytes 405, encoding-timestamp 601 (created by PEM using an internal real-time clock, which is not shown; a real-time clock is technology known to persons with ordinary skill in the art) and PEM-ID-string 415.

PEM 300 contains PEM-digital-signature-module 602, which implements a digital signature algorithm, and cryptographic-secret 306 contains digital-signature-private-key 603 both types known to persons having ordinary skill in the art. PEM-digital-signature-module 602 combines digital-signature-input-bytes 600 and digital-signature-private-key to create PEM-digital-signature-bytes 604. PEM module creates validation-bytes 406 using encoding-timestamp 601 and PEM-digital-signature-bytes 604.

FIG. 6B shows the data and, processing steps performed by password-validation-module 114. Received-validation-bytes 521 consist of received-timestamp 650 and received-digital-signature-bytes 651. In the example process, received-timestamp 650 is a copy of encoding-timestamp 601 and received-digital-signature-bytes 651 are copies of PEM-digital-signature-bytes 604.

Password-validation-module 114 assembles received-digital-signature-input-bytes 652 using received-response-bytes 519, received-password-bytes 520, received-timestamp 650 and received-PEM-ID-string 509. Password-validation-module 114 contains digital-signature-validation-module 653, of a type appropriate to PEM-digital-signature-module 602. PEM-record 121 contains public-key 654. Public-key 654 corresponds to digital-signature-private-key 603 in a manner known to persons with ordinary skill in the art. Digital-signature-validation-module 653 processes received-digital-signature-bytes 651, received-digital-signature-input-bytes 652 and public-key 654 in a manner known to persons with ordinary skill in the art to produce digital-signature-validation-signal 655. Digital-signature-validation-signal 655 indicates to validation-matches-decision 527 whether to proceed to successful-authentication-state 528 or failed-authentication-state 529.

FIG. 6 and the corresponding discussion are for purposes of explanation and should not be considered limiting. Persons with ordinary skill in the art will recognize that FIG. 6 shows one example out of the possible embodiments of validation schemes. It will be understood that any number of validation schemes are possible, combining different inputs and processing steps and by reordering the inputs and processing steps.

In some embodiments, each use of cryptographic-secret 306 increments a counter (not shown) in PEM 300. Digital-signature-input-bytes 600 includes the value of the counter wherein, server 112 verifies that the count value in received-digital-signature-input-bytes 652 is greater than the count value from any prior instance of received-digital-signature-input-bytes 652 from that particular instance of PEM 300.

Persons having ordinary skill in the art will know that an example of digest authentication is used by the UNIX operating system, as well as many other authentication systems. The UNIX OS does not store passwords directly but instead stores the output of a one-way function. A one-way function performs an operation that cannot be reversed to produce the original input. However, given the same input, a one-way function will always yield the same output. Such a function is often referred to as a hash function. It will be understood that a properly chosen hash function yields a seemingly random output. A hash algorithm that produces a sufficient quantity of data virtually guarantees that only the original input text can produced the same output. Examples of non-limiting common hash algorithm in use today includes the MD5, SHA-1 and SHA-256 hash algorithms.

Figure 7A:
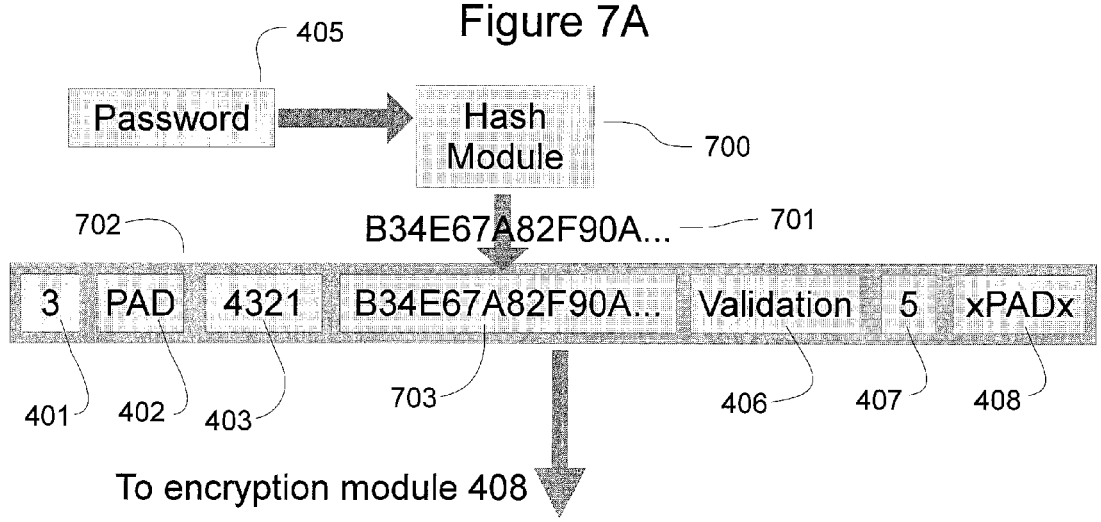
FIGS. 7A and 7B are schematic representations of modifications to the password packet encoding and validation steps needed to implement digest password validation in an embodiment of the present invention.
Figure 7B:
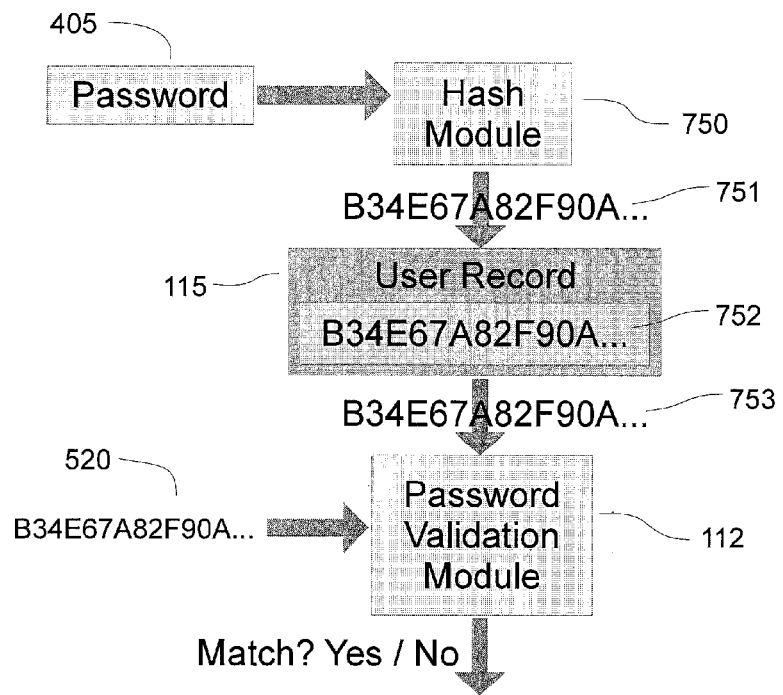

FIG. 7 shows one scheme for applying digest authentication to the current invention. Persons with ordinary skill in the art will recognize that FIG. 7 is a supplement to FIGS. 4 and 5. FIG. 7A shows the additional data and processing step performed by PEM 300, which includes PEM-hash-module 700. FIG. 7B shows the additional data and processing steps performed by password-validation-module 114. PEM-hash-module 700 implements a hash algorithm known to persons with ordinary skill in the art. When PEM 300 creates encoded-password-packet-string 416 during encoding-state 354, encoding-module 304 passes password-bytes 405 through PEM-hash-module 700 to create hashed-password-output 701. Within the context of FIG. 4, plaintext-hashed-password-packet 702 replaces plaintext-password-packet 400. The plaintext password fields, i.e. length-of-password-bytes 404 and password-bytes 405, are replaced by hashed-password-bytes 703. Hashed-password-output 701 are placed in hashed-password-bytes 703.

Persons with ordinary skill in the art will recognize that the remainder of the steps performed by encoding-module 304, as shown in FIG. 4, remain the same. After encoding-module 304 has assembled plaintext-hashed-password-packet 702, plaintext-hashed-password-packet 702 is passed to encryption-module 409 to be processed in a manner similar to plaintext-password-packet 400 described above.

FIG. 7B shows the data and processing steps performed by server 112 and password-validation-module 114. Server 112 contains enrollment-hash-module 750 of a type similar to PEM-hash-module 700. During enrollment (the process of creating user-record 117), bytes representing password 105, presumed to be equivalent to password-bytes 405, are passed through enrollment-hash-module 750 to create enrollment-hash-bytes 751, which are stored in user-record 117 as stored-password-bytes 752.

During password-matches-decision 526, password-validation-module 114 accesses database 116 to get stored-password-bytes 752 as retrieved-password-bytes 753. Password-matches-decision is based on equality between retrieved-password-bytes 753 and received-password-bytes 520. If the byte sequences are equal, password-validation-module 114 proceeds to successful-authentication-state 528. If the bytes sequences are not equal, password-validation-module 114 proceeds to failed-authentication-state 529. This example embodiment is for purposes of explanation and should not be considered limiting. It will be understood that many forms of digest authentication can be implemented without departing from the novel scope of this invention.

Figure 8A:
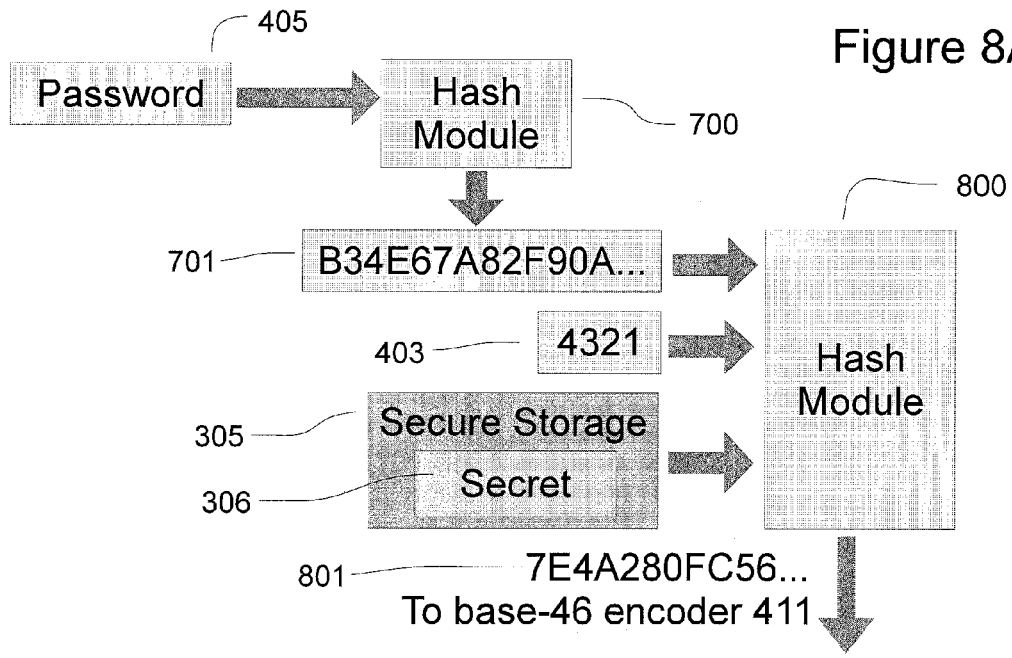
FIGS. 8A and 8B are schematic representations of modifications to the password packet encoding and validation steps needed to implement an alternative digest password validation scheme.
Figure 8B:
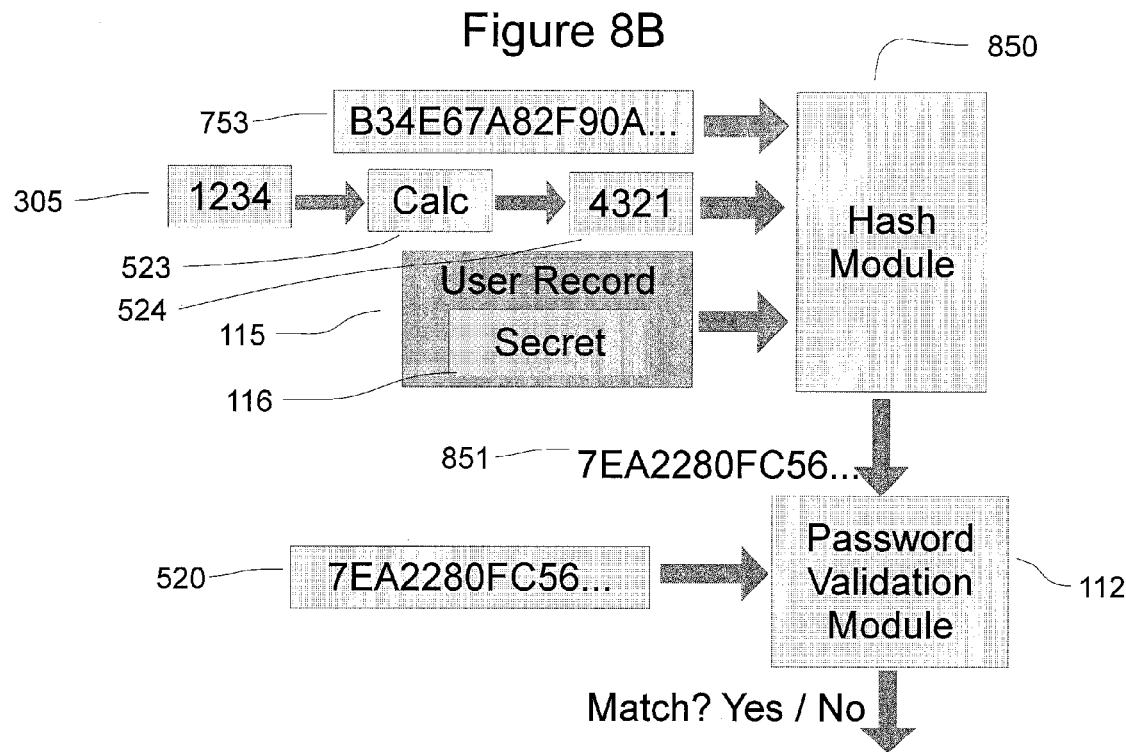

Different forms of digest authentication are of course possible, for example, FIGS. 8A and 8B show the operation of one embodiment of this invention using an alternative digest authentication scheme. Referring to FIG. 8A, the additional data and processing step performed by PEM 300 are shown. As shown in FIG. 7, encoding-module 304 first passes password-bytes 405 through PEM-hash-module 700 to generate hashed-password-output 701. A block-of-bytes comprising hashed-password-output 701, response-bytes 403 and cryptographic-secret 306 are then passed through second-PEM-hash-module 800 to create twice-hashed-password-bytes 801. Twice-hashed-password-bytes 801 are passed to base-64-encoder 411 with the remainder of the process, as previously described above in relation to FIG. 4, remaining unchanged.

Referring to FIG. 8B, there is shown the data and processing steps performed by password-validation-module 114. Password-validation-module 114 contains expected-response-calculator 523; passing stored-challenge-data 305 through generate-expected-response-step 523 to generate expected-response-bytes 524. Password-validation-module 114 contains second-validation-hash-module 850, of a type similar to second-PEM-hash-module 800. A block of bytes comprising retrieved-password-bytes 753, expected-response-bytes 524 and user-secret-data 118 are passed through second-validation-hash-module 850 resulting in expected-twice-hashed-bytes 851. Password-validation-module 114 compares expected-twice-hashed-bytes 851 to received-password-bytes 520; if the byte sequences are equal, password-validation-module 114 proceeds to successful-authentication-state 528 however, if the bytes sequences are not equal, password-validation-module 114 proceeds to failed-authentication-state 529.

FIG. 8 is for explanation and should not be considered limiting. It will be understood that twice-hashed-password-bytes 801 and expected-twice-hashed-bytes 851 can be created using any byte sequence known to both PEM 300 and server 112. Further, digest password generation and validation neither requires nor precludes the use encryption-module 409 and/or decryption-step 516. Finally, digest password generation and validation neither requires nor precludes the inclusion of twice-hashed-password-bytes 801 in a larger block of bytes similar to plaintext-hashed-password-packet 702.

Referring to FIG. 9A an embodiment of the invention similar to password-encoding-device 119 is shown. In this embodiment, password-encoding-device 119 comprises keyboard-communication-module 301, PEM 300 including all sub-elements, and computer-communication-module 309. Here, keyboard 102 is an ordinary keyboard comprised of key-switch-matrix 904 including tab-key 905 and enter-key 906, key-scan-module 902 and key-scan-transmission-module 901. It will be understood that this is a simple schematic of an ordinary keyboard available at any electronics retailer today. Key-switch-matrix 904 typically comprises a collection of buttons and a collection of wires connecting the switches to key-scan-module 903 which uses well known techniques to detect when user 100 presses a particular key and which key user 100 pressed. Key-scan-module 903 generates key-scan-code 902 appropriate to the detected key pressed. Key-scan-code 902 is then sent to key-scan-transmission-module 901. Typically, as was shown in FIG. 1A without password-encoding-device 119, key-scan-transmission-module 901 sends key-scan-code 902 to computer 101.

As shown in FIG. 1B and in FIG. 9A, both with password-encoding-device 119 present, key-scan-transmission-module 901 sends key-scan-code 902 to keyboard-communication-module 301. Keyboard-communication-module 301 sends key-scan-code 902 to PEM 300 where it is processed as described above. As described above, PEM 300 sends its output to computer-communication-module 309 and computer-communication-module 309 sends and receives data to and from computer 101.

FIG. 9B shows an embodiment where PEM 300 is embedded in physical keyboard 102. In a typical keyboard, of the type known to persons having ordinary skill in the art, key-scan-module 903 and scan-code-transmission-module 901 are instantiated in microcontroller 907. (The term "microcontroller" here is used to denote a single chip contain all of the elements of a computer system, including a processor, memory and other elements, such as communication modules, I/O controllers, as well as other common elements.) Here, the elements and sub-elements of PEM 300 are instantiated using elements present in microcontroller 907.

One difference between the embodiment shown in FIG. 9A and the embodiment shown in FIG. 9B is the elimination of keyboard-communication-module 301. Another difference is that the computer-communication-module 309, shown in FIG. 9B, has taken on the functionality of scancode-transmission-module 901 in the FIG. 9A embodiment.

Persons having ordinary skill in the art will recognize that any communication protocol or combination thereof can be used by key-scan-transmission-module 901, keyboard-communication-modules 301 and computer-communication-module 309, without departing from the novel scope of the present invention. A non-limiting list of protocols that can be employed to provide the functions described, includes the USB, PS/1 and PS/2 keyboard protocols, IEEE-1394, SCSI and Ethernet, all of which are known to persons having ordinary skill in the art. Keyboard-cable 103 and additional-cable 120 can either use a physical cable or a wireless technology, such as Bluetooth™, IEEE-802 or any other appropriate technology known to persons with ordinary skill in the art, as needed or desired.

It will be understood that PEM 300 can be implemented using any type of integrated circuit technology, including but not limited to microcontroller, ASIC (Application Specific Integrated Circuit), gate array, FPGA (Field Programmable Gate Array), or any combination thereof, with departing from the novel scope of this invention. Further, PEM 300 can be incorporated into a circuit, or circuits, containing other processing or storage elements, without departing from the novel scope of the present invention.

Within a laptop-style computer, key-scan-module 903 (FIG. 9B) and PEM 300, including all of its sub-elements, can be part of a larger integrated circuit, in order to save space and for efficiency reasons. The communication between a main central processing unit (CPU) of computer 101 and PEM 300 can then occur over a data bus internal to computer 101, in one example, via a major controller chip (e.g. the "North Bridge" or "South Bridge" chip, to use Intel parlance). The PEM 300 can be instantiated in an integrated circuit placed on the computer's 101 motherboard. Persons with ordinary skill in the art will recognize that this can be true for any embodiment of a computer 101, such as laptop, tablet, desktop, blade and other types of computers. It will be understood that, within a mobile type embodiment of computer 101, for instance a tablet type of computer or a cell phone, key-scan-transmission-module 901 might be implemented using a virtual keyboard of the type implemented on a touch-screen display. In some embodiments of this invention, PEM 300 is embedded within the touch-screen controller of computer 101.

In some embodiments of PEM 300, the computer will be shared by more than one user. Examples of this are keyboards and/or computers shared among several office workers or among several family members. As a further examples, a public keyboard or computer, such as one at a kiosk or "Internet café," and an automatic teller machine (ATM). Because of the public nature of these keyboards and in order to maintain the second factor in two-factor authentication, i.e. something that you have, these embodiments of PEM 300 will contain further elements. A shared embodiment of PEM 300 will tend to limit the number of people who can impersonate a user, which will provide protection against unauthorized access from outside of the shared environment; but there are circumstances where this protection is not considered to be adequate. (It will be understood that the determination of "adequacy of protection" is typically made by security policy or such enforcement professionals as determined by the requirements of the system, group or industry, and is outside of the scope of this invention).

FIG. 10 shows several embodiments that incorporate external objects to provide a 'something that you have' form of authentication. FIG. 10A shows a generic version of this invention incorporating an external object. In this example embodiment, PEM 300 is incorporated in keyboard 102 and further comprises external-device-communication-module 1000, which communicates with external-device 1001. (It will be understood that external-device 1001 refers to any electronic device that contains the elements necessary to supplement or implement PEM 300.) External-device 1001 contains external-cryptographic-secret 1002. Persons having ordinary skill in the art will recognize that there are numerous communication technologies that can be used to connect external-device 1001 and PEM 300; such as external-device-communication-module 1000 and external-device 1001 can communicate using either a physical plug and socket or a wireless technology such as Bluetooth® or RFID. It will be understood that the nature and form that are appropriate for the object are matters of personal preference, usage convenience and implementation cost. Therefore, some embodiments of PEM 300 can comprise a plurality of external-device-communication-module 1000s in order to enable connection to several different forms of external-device 1001.

Figure 10B:
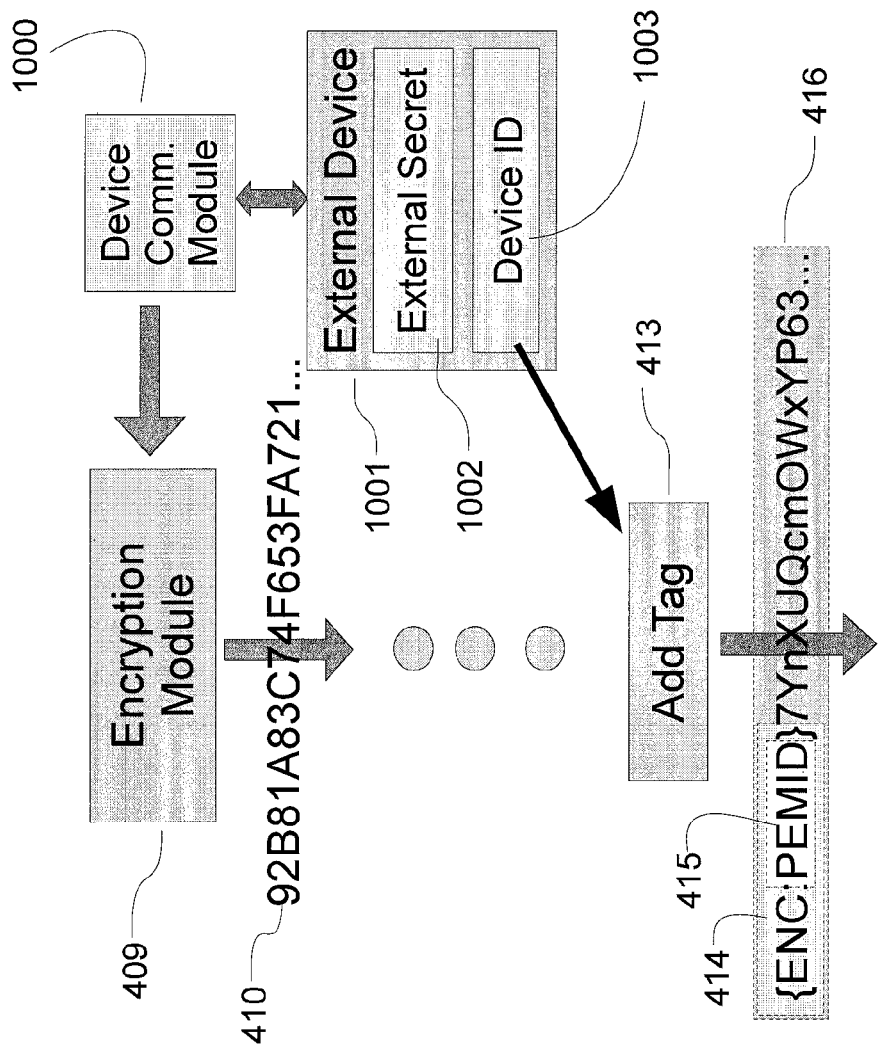
FIG. 10A through 10G are schematic representations of embodiments of the PEM using an external object.
Figure 10A:
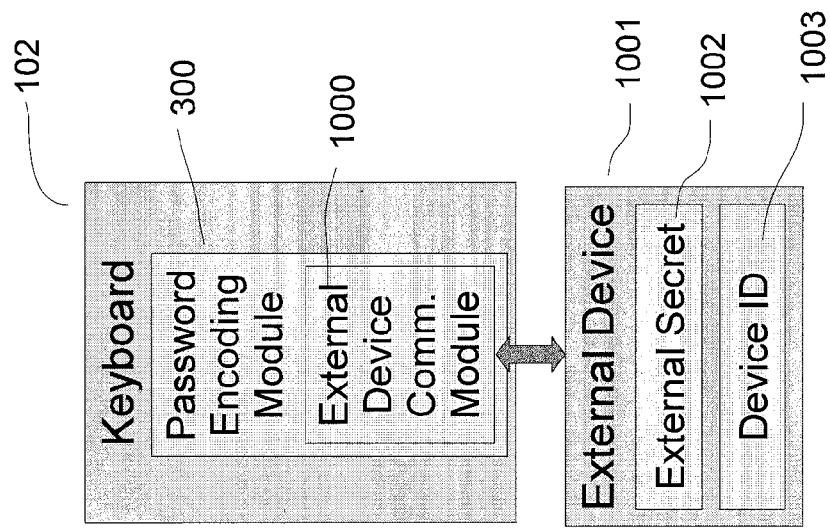

In the example in FIG. 10A, external-device 1001 contains external-cryptographic-secret 1002. In a preferred embodiment, each implementation of external-device 1001 will contain a unique instance of external-cryptographic-secret 1002. It will be understood that there are numerous techniques and methods in which external-cryptographic-secret 1002 can be used to replace, supplement, identify or unlock cryptographic-secret 306. External-device 1001 also contains external-device-ID 1003. It will be understood that external-device-ID 1003 can be used to replace, supplement, identify or unlock PEM-ID-string 415.

It will be understood that many embodiments of the present invention will need to use secure communications, between external-device-communication-module 1000 and external-device 1001, to prevent the exposure of external-cryptographic-secret 1002 to electronic eavesdropping, or other means of its discovery by unauthorized parties. In some embodiments, external-device-communication-module 1000 and external-device 1001 use a secure communication channel and in other embodiments, external-cryptographic-secret 1002 is encoded or encrypted in a manner such that only PEM 300 can decode or decrypt it.

If external-device-communication-module 1000 cannot communicate with external-device 1001, for example, if external-device 1001 is removed from the vicinity of external-device-communication-module 1000, PEM 300 generates an error message when password-state-machine 310 attempts either a start-gather-password-transition 351 or a start-encoding password-transition 353. If PEM 300 determines that external-cryptographic-secret 1002 is not valid, PEM enters an error state and generates an error message.

Referring again to FIG. 10B, modified data and processing steps similar to data and processing steps shown in FIG. 4 are shown. In FIG. 10B, encryption-module 409 accesses external-device-communication-module 1000 to retrieve external-cryptographic-secret 1002, which replaces cryptographic-secret 306. Tagging-module 413 accesses external-device-communication-module 1000 to retrieve external-device-ID 1003, which is used to generate PEM-ID-string 415, as shown in FIG. 10B.

Figure 10D:
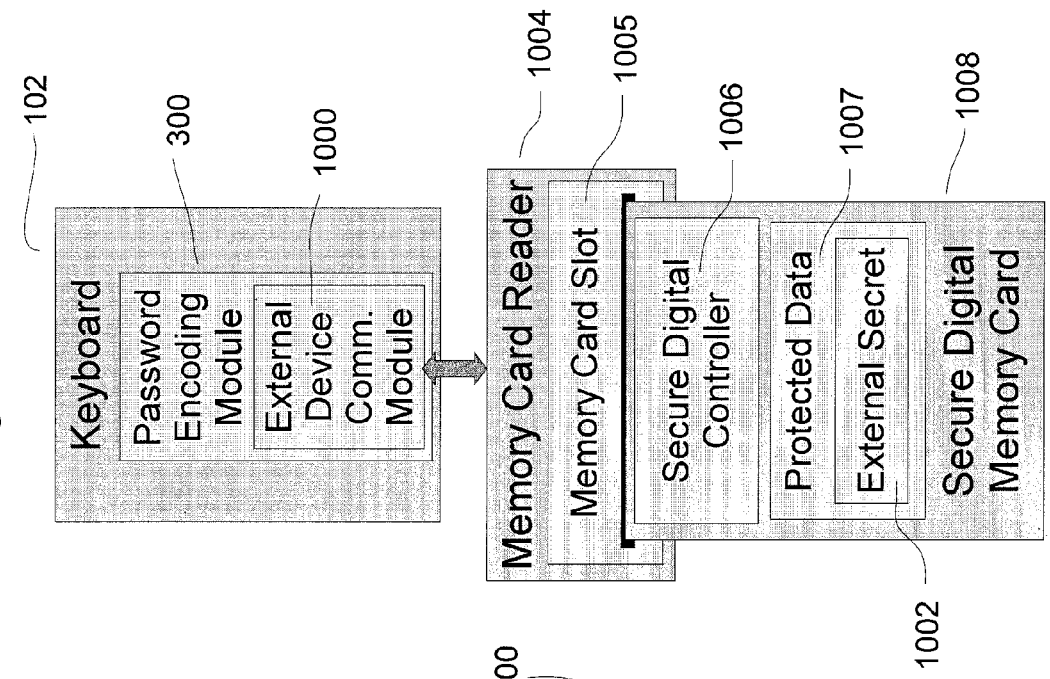
Figure 10C:
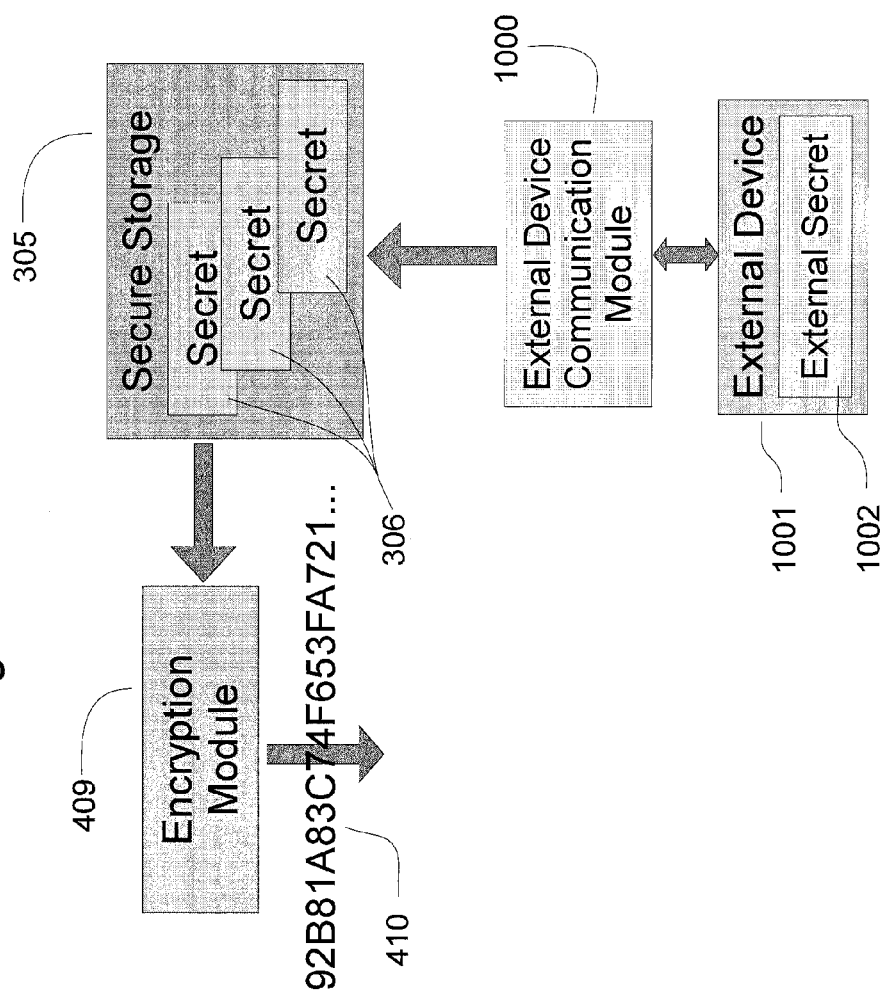

Referring now to FIG. 10C, data and processing steps similar to data and processing steps shown in FIG. 4 are shown; in this embodiment when encryption-module 409 accesses secure-storage 305, secure-storage 305 accesses external-device-communication-module 1000 to retrieve external-cryptographic-secret 1002. Secure-storage 305 then uses external-cryptographic-secret 1002 to select cryptographic-secret 306 from among a plurality of cryptographic-secret 306s.

Because the contents can be protected, a Secure Digital (SD) memory card or similar technology might be difficult to clone and therefore be useful as an embodiment of external-device 1001. SD memory cards contain non-volatile memory and a controller circuit. These cards are often found in digital cameras, smart phones, tablet type computers, as well as many other electronic devices. SD memory cards are removable. The only way to access the non-volatile memory in the SD memory card is through the controller circuit in the SD memory card, which is why the technology is referred to as 'Secure' Digital memory.

FIG. 10D shows an embodiment of PEM 300 similar to the embodiment shown in FIG. 10A, where external-device 1001 is specifically an SD-memory-card 1008. SD-memory-card 1008 comprises secure-digital-memory-controller 1006 and non-volatile storage of a type known to persons with skill in the art. Secure-digital-memory-controller 1006 prevents unauthorized access to protected-data-memory-region 1007. External-cryptographic-secret 1002 is contained within SD-memory-card's 1008 protected-data-memory-region 1007. External-device-communication-module 1000 accesses SD-memory-card 1008 through an SD-memory-card-reader 1004. SD-memory-card-reader 1004 comprises SD-memory-card-slot 1005. SD-memory-card-slot 1005 allows SD-memory-card 1008 to be inserted and removed.

FIGS. 10a through 10D are shown in the context of a keyboard. However, it will be understood that an external-device-communication-module 1000 can be added to any embodiment of PEM 300 without departing from the novel aspect of this invention.

Figure 10E:
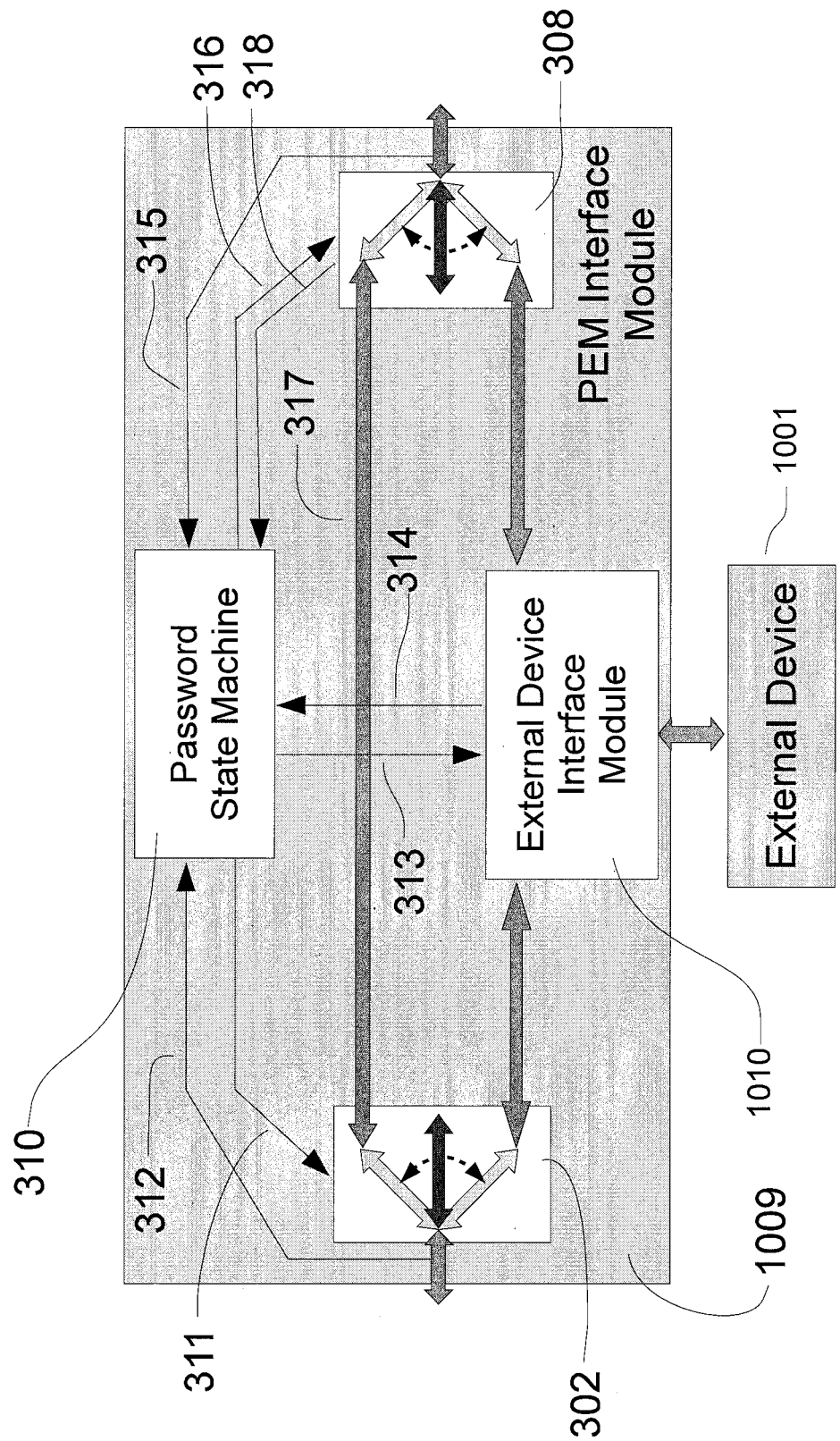

Referring now to FIG. 10E, there is shown an embodiment of the present invention where the functionality of PEM 300 has been split between a PEM-interface-module 1009 and an external-device 1001. PEM-interface-device 1009 controls external-device 1001 through external-device-interface-module 1010. In the present embodiment, external-device 1001 comprises plaintext-password-buffer 303, encoding-module 304, secure-storage 305, cryptographic-secret 306, and encoded-password-packet-buffer 307. Persons having ordinary skill in the art will recognize that some aspects of password-state-machine 310 can be implemented on external-device 1001.

It will be understood that, in embodiments having characteristics similar to the schematic shown in FIG. 10E, external-device 1001 defines the specific password-encoding scheme. Further, different embodiments of external-device 1001 can implement different password encoding schemes. Hence embodiments similar to that shown in FIG. 10E can allow different embodiments of server 112 to practice different encoding protocols, without departing from the novel scope of the present invention. This allows different organizations to implement application specific protocols each driven by different needs. For example, one organization decides that a lower cost solution with limited authentication security is sufficient, while another organization decides that authentication security is paramount regardless of the cost. Each organization deploys different solutions while still sharing many components of the overall infrastructure.

In some embodiments of external-device 1001, external-cryptographic-secret 1002 can be written so as to allow PEM 300 to write cryptographic-secret 306 to external-cryptographic-secret 1002.

It will be understood that there is value in server 112 being able to discern the identity of external-device 1001 in order to practice this invention. To this end, in many embodiments, external-device 1001 contains external-device-ID 1003. In some embodiments, an external-device-ID 1003 is used to replace or otherwise generate PEM-ID-string 415. In some embodiments, an external-cryptographic-secret 1002 contains PEM-ID-string 415. In some embodiments, a field representing external-device-ID 1003 is added to a plaintext-password-packet 400. In some embodiments, external-device-ID 1003 is added to digital-signature-input-byte 600, for example replacing PEM-ID-string 415.

Figure 10F:
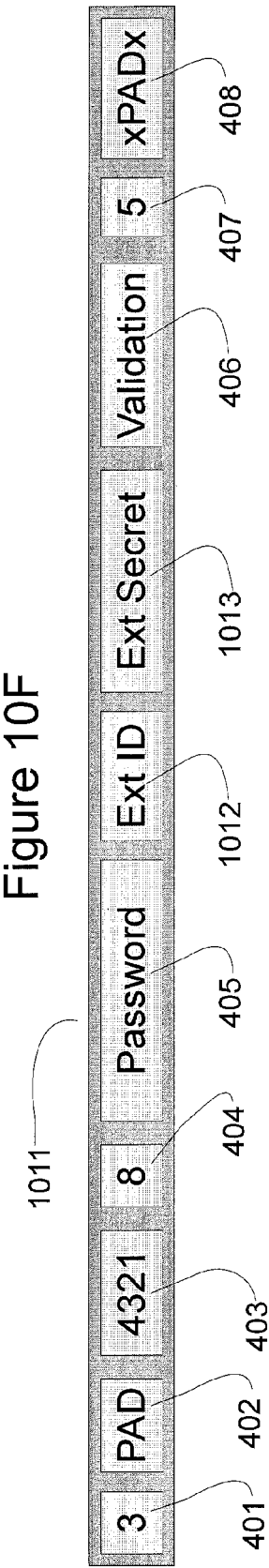
Figure 10G:
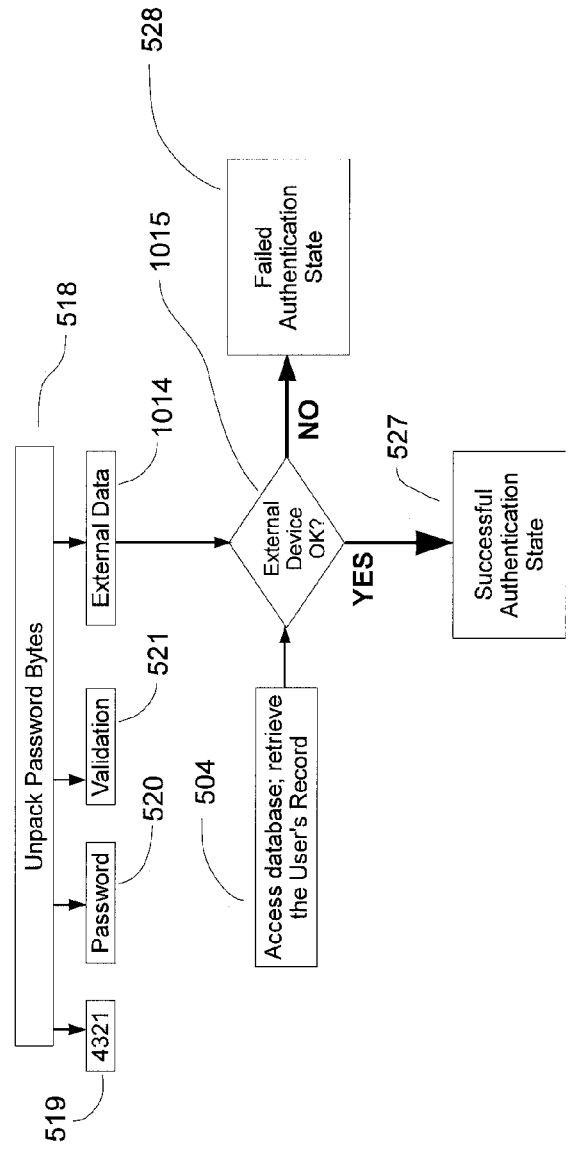

FIG. 10F and FIG. 10G show an embodiment where external-cryptographic-secret 1002 and/or external-device-ID 1003 are added to plaintext-password-packet 400. FIG. 10F shows the additional data elements produced by PEM 300 and FIG. 10G shows the additional data and processing steps performed by password-validation-module 112. As shown, external-device-plaintext-password-packet 1011 comprises the fields of plaintext-password-packet 400 with the addition of external-device-ID-field 1012 and external-cryptographic-secret-field 1013. Further processing steps performed on external-device-plaintext-password-packet 1011 are as shown in FIG. 4; cryptographic-secret 306 is used to encrypt external-device-plaintext-password-packet 1011. Server 112, using software included therein, decodes the packet in the manner as shown and described in relation to FIG. 5. In an embodiment illustrated in FIG. 10G, an unpacking-step 518 also extracts received-external-data-bytes 1014. In most embodiments, received-external-data-bytes 1014 is a copy of the bytes in external-device-ID-field 1012 and external-cryptographic-secret-field 1013. External-device-okay-decision 1015 is based on received-external-data-bytes and information stored in user-record 117 that associates a user 100 with an external-device 1001.

It will be understood that the embodiments shown in FIG. 10 are only a few of numerous schemes, without departing from the novel scope of the present invention, for adding an external-device 1001 to a PEM 300. Further, it will be understood that the functionality of an external-device 1001 can be achieved with any number of technologies that support removable, difficult-to-clone memory devices. A list of technologies that can be used by an external-device-communication-module 1000 include, without limitation, SD and other types of memory cards, USB supported devices, contact Smart Cards, contactless Smart Cards, RFID and BlueTooth devices, audio jack communications, near field communications or any other forms of digital connectivity technology available today or in the future, without departing from the novel scope of the present invention.

It will be understood that there are various schemes for storing an external-cryptographic-secret 1002 on an external-module 1001. In some embodiments, cryptographic-secret 306 is stored in secure-storage 305 and external-cryptographic-secret 1002 is used to decrypt or otherwise unlock secure-storage 305. In some embodiments, a cryptographic-secret 306 is stored in external-cryptographic-secret 1002. To prevent the external-cryptographic-secret 1002 from being exposed in some embodiments PEM 300 encrypts external-cryptographic-secret 1002 before writing external-cryptographic-secret 1002 to external-device 1001. In some embodiments, encoding-module 304 combines cryptographic-secret 306 with external-cryptographic-secret 1002 to create the key used to create encrypted-password-packet-bytes 410.

To help user 100 prevent accidentally leaving external-device 1001 attached to PEM 300, some embodiments of external-device 1001 use a contactless technology, such as a contactless smart card or a fob with an RFID circuit, or other technologies generally known and others known to persons having ordinary skill in the art. In some embodiments, external-device-communication-module 1000 is configured to require user 100 to "activate" or otherwise create a new external-device session such that each password-state-machine 310 enters the encode-password-state 354 by bringing external-device 1001 in range of the external-device-communication-module 1000.

Ideal embodiments of the present embodiment will physically place password-encoding-module 300 between key-scan-module 903 and the CPU of computer 101 such that only key-scan-module 903 and PEM 300 can observe raw, plaintext key-scan-code 902. It will be seen that unless PEM 300 or keyboard 102 become compromised malware on computer 101 cannot observe the raw, plaintext passwords.

In some embodiments similar to those shown and described in relation to FIG. 9A, password-encoding-device 119 can be used to add PEM 300 to an external keyboard 101. In some embodiments similar that shown in FIG. 9B, PEM 300 can be embedded in keyboard 101. However, when computer 101 is embodied in a laptop-type computer neither embodiments of this invention similar to that shown in FIG. 9A nor embodiments similar to that shown in FIG. 9B would provide a path to retrofit existing systems.

Therefore, when computer 101 is embodied in a mobile device type computer, such as a tablet type computer or a cell phone, key-switch-matrix 904 might be a virtual keyboard, where key-switch-matrix 904 is instantiated using a touch screen. When computer 101 is embodied in a mobile type device, neither embodiments of this invention similar to those shown in FIG. 9A nor embodiments similar to that shown in FIG. 9B provide a path to retrofit existing systems. It will be seen then that when policy, convenience or the particular embodiment of computer 101 prevents or precludes the use of embodiments of this invention similar to those shown in FIGS. 9A and 9B, embodiments similar to FIG. 10E can be used.

In some embodiments, computer 101 can comprise a software implementation of PEM 300 that accesses an external device in a manner similar to that shown in FIG. 10A. In some embodiments, computer 101 can contain a software implementation of PEM-interface-module 1009 which requires an external-device 1001. In some embodiments, the software implementation of PEM 300 or PEM-interface-module 1009 is embedded in the operating system. In some embodiments, the software implementation of PEM 300 or PEM-interface-module 1009 is embedded in a software application that runs on computer 101.

Persons with ordinary skill in the art will recognize that a non-limiting list of technologies that can be used by software embodiments of PEM 300 or PEM-interface-module 1009 with external-device 1001 include, without limitation, SD and other types of memory cards, USB supported devices, contact Smart Cards, contactless Smart Cards, RFID and BlueTooth devices, audio jack communications, near field communications or any other forms of digital connectivity technology available today or in the future, without departing from the novel scope of the present invention.

Although the software embodiments of PEM 300 or PEM-interface-module 1009 do not protect the plaintext password from key-loggers or other malware, anti-virus software or other techniques on the computer will help to reduce this risk. In some software embodiments, PEM 300 or PEM-interface-module 1009 employ digital signature technology to ensuring that key components of software running on computer 100, for instance the keyboard driver, have not been altered.

Figure 11:
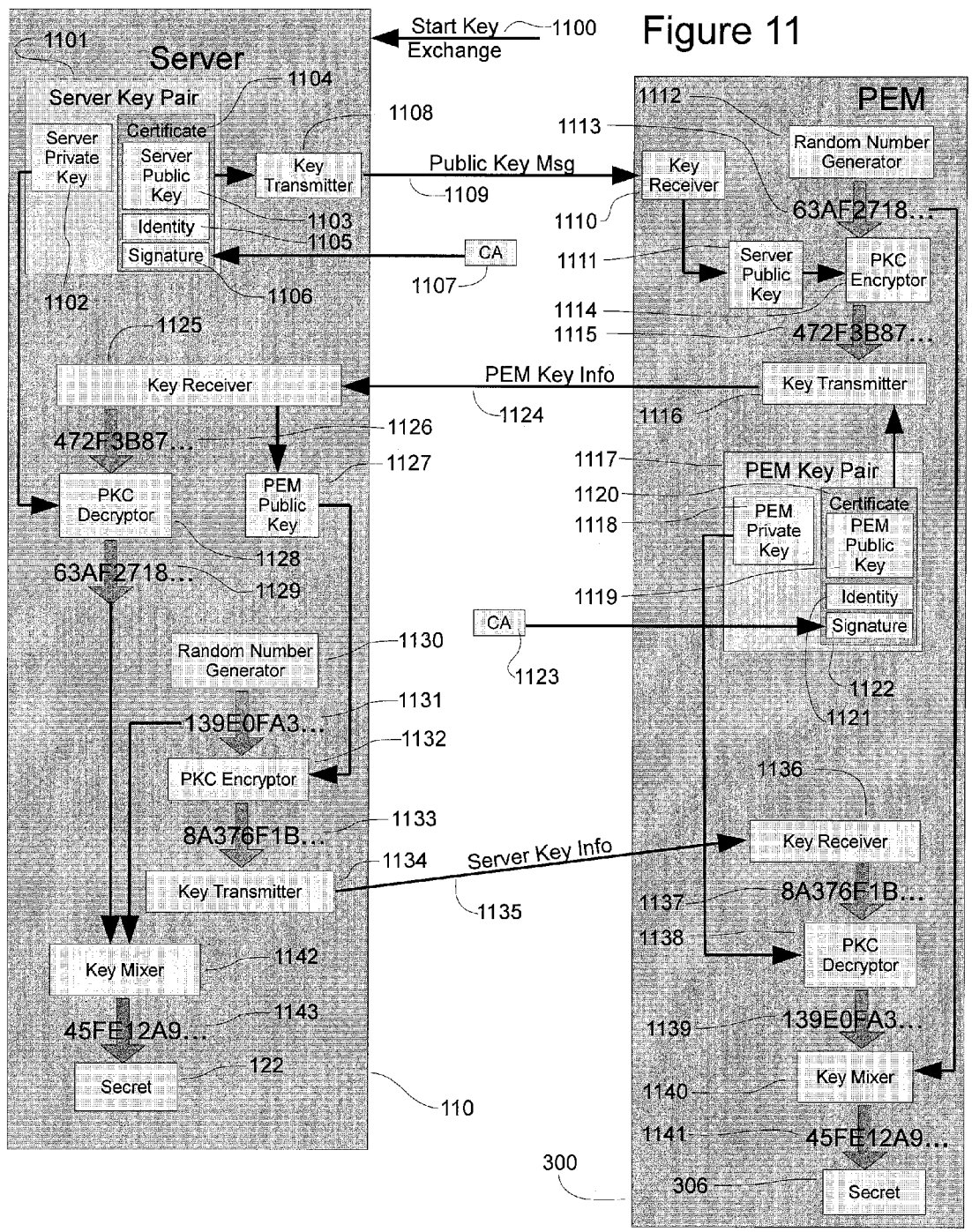
FIG. 11 is a schematic representation of a cryptographic key exchange protocol.

It will be understood that in ideal embodiments, server 112 and PEM 300 need to exchange cryptographic secrets in order to make cryptographic-secret 306 and PEM-secret-data 122 match. FIG. 11 shows one possible key exchange protocol that can be used to accomplish this. Persons having ordinary skill in the art will recognize that the key exchange protocol shown in FIG. 11 is similar to the protocol used to establish an SSL connection. Operations shown on the left side of FIG. 11 are performed on server 112; and operations shown on the right side of FIG. 11 are performed by PEM 300. Time generally proceeds from top to bottom but also proceeds back and forth as server 112 and PEM 300 transmit messages and wait for replies.

In the present embodiment a public key cryptography (PKC) relies on a key pair, which consists of two keys: the public key and the private key. The public key is used to encrypt a message and the private key is used to decrypt a message. Any entity can encrypt a message using the public key but only an entity with the private key, presumed in this embodiment to be a single entity, can decrypt the message. Server 112 has its key pair, server-key-pair 1101, which consists of server-public-key 1103 and server-private-key 1102. PEM 300 has a different key pair, PEM-key-pair 1117, which consists of PEM-public-key 1119 and PEM-private-key 1118. In the example protocol, enumerated and shown in FIG. 11, the key exchange process begins when server 112 receives request-public-key-message, as represented by arrow 1100. Persons with ordinary skill in the art will understand that this message might be generated by an unspecified module on server 112, by browser-program 106, by an unspecified program running on computer 101, or by an unspecified program on an unspecified computer on network 110. Server 112 use server-key-transmitter 1008 to transmit server-public-key-message, as indicated by arrow 1109, which contains server-public-key 1103. PEM-key-receiver 1110 translated public key message into copy-of-server-public-key 1111 and PEM 300 runs PEM-random-number-generator 1112 to produce PEM-key-half 1113. Then PEM-PKC-encryption-module 1114 uses copy-of-server-public-key 1111 to encrypt PEM-key-half 1113, thereby producing encrypted-PEM-key-half 1115.

In addition, PEM-key-transmitter 1116 builds PEM-key-information-message 1124, which contains encrypted-PEM-key-half 1115 and PEM-public-key 1119. PEM-key-transmitter 1116 transmits PEM-key-information-message, as indicated by arrow 1124, to server 112. Server-key-message-receiver 1125 receives PEM-key-information-message 1124 and extracts copy-of-encrypted-PEM-key-half 1126 and copy-of-PEM-public-key 1127. Server-PKC-decryption-module 1128 uses server-private-key 1102 to decrypt copy-of-encrypted-PEM-key-half 1126 into copy-of-PEM-key-half 1129. Server 112 runs server-random-number-generator 1130 to generate server-key-half 1131. Server-PKC-encryption-module 1132 uses copy of PEM-public-key 1127 to encrypt server-key-half 1131 thereby producing encrypted-server-key-half 1133. Second-server-key-transmitter 1134 creates and transmits server-key-information-message, as indicated by arrow 1135.

A second-PEM-key-receiver 1136 receives server-key-information-message 1135 and extracts copy-of-encrypted-server-key-half 1137. PEM-PKC-decryption-module 1138 uses PEM-private-key 1118 to decrypt copy-of-encrypted-server-key-half 1137 to produce copy-of-server-key-half 1139. PEM-key-mixer 1140 combines copy-of-server-key-half 1139 and PEM-key-half 1113 to produce PEM-copy-of-shared-secret 1141. PEM 300 stores PEM-copy-of-shared-secret 1141 in cryptographic-secret 306. Server 112 runs server-key-mixer 1142. Server-key-mixer 1142 combines copy-of-PEM-key-half 1129 and server-key-half 1131 to produce server-copy-of-shared-secret 1143. Server 112 stores server-copy-of-shared-secret 1143 in PEM-secret-record 122.

Persons having ordinary skill in the art will understand that it is expected that the copies of data are identical in make-up to the originals. A copy-of-PEM-key-half 1129 is expected to contain bytes that are identical to the bytes in PEM-key-half 1113. The copy-of-encrypt-PEM-key-half 1126 is expected to contain bytes that are identical to the bytes in encrypted-PEM-key-half 1115. The copy-of-server-key-half 1139 is expected to contain bytes that are identical to the bytes in server-key-half 1131. The copy-of-encrypted-server-key-half 1137 is expected to contain bytes that are identical to the bytes in encrypted-server-key-half 1133.

It is expected that server-key-mixer 1142 and PEM-key-mixer 1140 perform identical operations. Given the above knowledge, that the inputs to server-key-mixer 1142 and the inputs to PEM-key-mixer 1140 are identical, it will be understood that the server-copy-of-shared-secret 1143 and PEM-copy-of-shared-secret 1141 contains bytes that are identical. In some embodiments, security policies will require server 112 and PEM 300 to exchange keys periodically. In some embodiments, server 112 and PEM 300 will exchange keys before PEM 300 is distributed to user 100. In some embodiments, server 112 and PEM 300 will exchange keys the first time that user 100 requests a secure-webpage 115.

It will be understood that the operations as explained above can be reordered without departing from the novel scope of this invention. For example, PEM 300 might receive request-public-key-message 1100, resulting in the entire sequence being basically reversed. PEM 300 might receive server-public-key 1103 during an entirely different exchange. PEM 300 might store server 112's server-public-key 1103, perhaps in secure-storage 305. Likewise server 112 might receive PEM-public-key 1119 during an entirely different exchange. Server 112 might store send PEM 300's PEM-public-key 1119, perhaps in PEM-record 121. The key exchange protocol could then rely on one or both of these stored public key to remove some or all of the public key transmission and receipt aspects from this example key exchange.

In some embodiments, server-public-key 1103 and PEM-public-key 1119 are contained within server-certificate 1104 and PEM-certificate 1120, respectively. PKI certificates are public keys that are digitally signed by a certificate authority. As persons having ordinary skill in the art will know, a PKI certificate is basically a public key that has been digitally signed by a certificate authority (CA). For example, server-key-pair 1101 contains server-certificate 1104. Server-certificate 1104 comprises server-public-key 1103, server-identity-data 1105 and server-certificate-signature 1106. In this example, server-CA 1107 uses its private key (not shown for simplicity) to generate server-certificate-signature 1106. Entities can use server-CA 1107's public key to verify that server-public-key 1103 is linked to server-identity-data 1105. Similarly, PEM-key-pair 1117 contains PEM-certificate 1120 and comprises PEM-public-key 1119, PEM-identity-data 1121 and PEM-certificate-signature 1122. In this example, PEM-CA 1123 uses its private-key (not shown for simplicity) to generate PEM-certificate-signature 1122. Entities can use PEM-CA 1123's public-key to verify that PEM-public-key 1119 is linked to PEM-identity-data 1121.

Public key infrastructure technology is known to persons with ordinary skill in the art. Commercial CAs, such as Verisign®, produce certificates used by instances of server 112 to prevent other servers from impersonating server 112.

In some embodiments, server 112's certificate contains server 112's identity, which allows PEM 300 to be sure that server-public-key 1103 belongs to server 112. This allows PEM 300 to verify that copy-of-server-key-half 1139 came from server 112 and was not altered by another party.

In some embodiment, PEM-CA 1123 is operated by PEM 300's manufacturer. In some embodiments PEM-key-pair 1117, including PEM-certificate 1120 are programmed into PEM 300 during the manufacturing process. In some embodiments, server 112 acts as PEM-CA 1123, in which case PEM 300's certificate is signed by server 112. In some embodiments, PEM 300's certificate is programmed into the PEM 300's secure-storage 305 before PEM is distributed to user 100. PEM 300's certificate allows server 112 to verify that it performs the key exchange operation shown in FIG. 11 with PEM 300, and not with another entity on the network.

In some embodiments, the PEM 300 creates a new public/private key-pair for any or all key exchange operations. In some embodiments, a newly created public key is chained to the PEM 300's certificate to create a new PEM certificate.

Persons having ordinary skill in the art will recognize that PKC and PKI can be used in many different ways to enhance the security of the key exchange process. The methods listed above are for explanation and should not be considered limiting.

Persons with ordinary skill in the art will recognize that there are numerous extensions and enhancements that can be added to the above embodiments without departing from the novel scope of the invention. A few examples are discussed below.

In some embodiments of the present invention, database 116 is a public database available to a plurality of server 110s. Database 116 contains records of known bad instances of PEM 300 and external-device 1001. In some embodiments, server 112 rejects any authentication attempt using a known-bad-instance of PEM 300 or a known-bad-instance of external-device 1001. Persons having ordinary skill in the art will recognize that this will tend to raise the cost to unauthorized persons trying to break into secure-webpage 115, and thereby further reduce the incentive to do so.

Some embodiments of the present invention allow computer 101 to suspend and resume the gather-password-state 352 in order to accommodate the input requirements of a multitasking OS. During suspension, PEM 300 reverts to transparent-mode 350, but the contents of plaintext-password-buffer 303 remain unchanged. Upon resumption of a gather-password-state 352, further keystrokes will be added to the end of plaintext-password-buffer 303.

In some embodiments, challenge-data-text 264 is displayed by browser-program 106 and user 100 is required to manually type the challenge-data-text 264. User 100 might type challenge-data-text 264 before or after password 105, either based on agreement or instructions from server 112. In some embodiments, entry of challenge-data-text 264 is signaled by a button, key or key combination (for example Alt-Control-F 11). All or part of the challenge-data-text 264 might be displayed by the browser in a way that makes it difficult for a machine to respond to it, for instance as a CAPTCHA image. (As is known in the art, CAPTCHA (an acronym for "Completely Automated Public Turing test to tell Computers and Humans Apart") is a term used to describe images that contain text that a human can read but that a machine using optical character recognition (OCR) has difficulty deciphering. KAPTCHA is often used on the Internet today to try to prove that an HTTP "POST" message came from a human operator.)

It will be understood that one instance of PEM 300 can be used with a plurality of servers 112, in which case PEM 300 might contain a plurality of cryptographic-secret 306. A non-limiting list of information PEM 300 might use to select from the plurality of cryptographic-secret 306s is comprised of webpage-URL 200, submission-URL 263, data contained within challenge-data-text 264 or an SSL certificate associated with webpage-URL 200.

It will be understood that the preferred embodiment allows one instance of server 112 to be used with a plurality of PEM 300s. Therefore, it should be assumed that server 112 contains a plurality of PEM-record 121. In the preferred embodiment, PEM-ID-string 415 is used to differentiate among the plurality of PEM-record 121s. In some embodiments server 112 can be linked to one instance of PEM 300, such linkage eliminates the need to transmit PEM-ID-string 415.

In some implementations, PEM 300 requires a password or other authentication (for instance biometric authentication) in order to access cryptographic-secret 306. Persons with ordinary skill in the art will recognize that this might provide additional strength to the authentication, guarding against abuse of PEM 300 in cases where PEM 300 has been lost or stolen. In some embodiments, PEM 300 exchanges information with computer 101 before accessing cryptographic-secret 306. Persons with ordinary skill in the art will recognize that this ties PEM 300 to a particular instance of computer 101 or to a plurality of computer 101s. In some embodiments, PEM 300 is unlocked by computer 101 when computer 101 is a particular computer, for instance a home or office computer, but requires additional authentication such as a password or biometric when connected to unknown instances of computer 101, for example an Internet café computer.

In some embodiments, PEM 300 measures the time intervals between keystrokes to determine if the input is coming from user 100. In some embodiments, PEM 300 limits the input rate. In some embodiments, PEM 300 compares the pattern of time intervals to stored time intervals to determine if user 100 is a particular user 100 out of a plurality of user 100s.

Many of the disclosed embodiments revolve around a client/server architecture, commonly used in the Internet. It will be understood that the present invention can be applied to any situation where text-based authentication is used. Such situations might include programs that require individuals to login, such as an accounting software package or even the computer operating system itself. A non-limiting list of other uses might include password encoding to unlock documents (e.g. PDF documents or Excel spreadsheets), files (e.g. encrypted ZIP files) or access copy-protected material (e.g. for digital rights management systems).

The BIOS (Basic I/O System) implementation can require a password in order for computer 101 to power up or load the operating system. (Persons with ordinary skill in the art will know the function of computer 101's BIOS and the process that computer 101 goes through to boot up and load an operating system.) In some embodiments, password-validation-module 114 is built into computer 101's BIOS. In such embodiments, computer 101's BIOS does not allow computer 101 to load the operating system until user 100 has entered a correct password using PEM 300.

The disclosed embodiments revolve around securing password 105, but the invention can also be used to secure other information, for instance a user's credit card information or social security number. This prevents the unencrypted information from being visible to any malware that resides on the computer and from being disclosed to any other entities on network 110. In the case of credit card information, password-bytes 405 and/or validation-data 406 might comprise or be derived from other information such as a monetary transaction amount, the merchant's identity or other information commonly found in commercial transactions.

PEM 300 might be part of a device or software that includes other functionality. For instance, PEM 300 might be part of a biometric sensor. In some embodiments, keyboard 102 might plug into the sensor and the sensor would plug into computer 101. In some embodiments, a biometric sample and the password might be encoded into a single encoded-password-packet 416.

Persons with ordinary skill in the art will recognize the need to secure database 116 and in particular PEM-secret 122 and user-secret 118.

Without limitation, it will be understood that a goal of the present invention is to protect password 105 from discovery. A further goal is to prevent access to server 112 even if password 105 has been compromised and a further goal is for the use and implementation of the invention to prove to be user-friendly. The following discussion briefly describes how the present invention improves the security of user-name and password authentication. From the perspective of user 100, nothing has changed from the user-name and password login process used today. Most or all of the differences between plaintext password authentication and authentication utilizing the present invention happen beyond the view of user 100. When user 100 attempts to access server 112, login-webpage 113 is displayed. User 100 types a user name and password. As user 100 types the password string, dots or asterisks appear in password-input-field 207. When user 100 hits 'Enter' key 906, browser-program 106 sends an HTTP message to server 112 and server 112 sends secure-webpage 115 to browser-program 106.

Persons having ordinary skill in the art will recognize that this invention protects the password 105 against disclosure. Key-loggers cannot discover password 105 because password 105 never exists on computer 101 in plaintext form. A phishing website cannot discover plain text password 105 because the phishing website does not know cryptographic-secret 306, which is needed to decrypt encoded-password-packet 416. The phishing server cannot simply submit the encoded-password-packet 416 in its entirety to gain access because response-bytes 403 will not match expected-response-bytes 524 for any authentication transaction other than the original.

In the present invention, each brute force guess of password 105 must start with a new request-secure-page-message 276. This overhead slows the process of making submission of guesses take much longer. More importantly, without cryptographic-secret 306, no guessed user-name-password-message 288 can reach successful-authentication-state 529. Often-times an unusually high number of user-name-password-message 288s that result failed-authentication-state 529s will alert the server 112 to a brute-force password cracking attempt, allowing server 112 to take appropriate action to prevent security breech.

In the present invention, PEM 300, comprising means known to persons having ordinary skill in the art, will not accept keystrokes that appear to have been entered at a speeds appreciably faster than a human can type. So even a stolen PEM 300, with its embedded cryptographic-secret 306 limits the guess speed to a few per minute rather than the millions or billions of guesses minute that can be created presently.

As will be evident to persons with ordinary skill in the art, the strength of authentication will be further enhanced by linking user 100 and user record 117 to a particular embodiment of PEM 300 or a collection of embodiments of PEM 300s. This is known in security parlance as "something that you have" authentication. When used in combination with the password authentication, this is known as two-factor authentication.

Although illustrative embodiments of the invention have been shown and described, it is to be understood that various modifications and substitutions may be made by those skilled in the art without departing from the novel spirit and scope of the invention.

What is claimed is:

1. A method of verifying a password, entered via a keyboard, for a computing device prior to permitting access, comprising the steps of:
   providing a password device, in communication with the keyboard and the computing device, to receive one or more messages, receive keystroke information comprising a manifestation of the pressing of keys on the keyboard, create one or more messages and transmit the one or more message created;
   receiving in the password device a command message comprising a command for the password device to operate in a special mode and challenge-data having one or more corresponding challenge-responses;
   receiving keystroke information in the password device during the special mode;
   receiving in the password device a command to stop operating in the special mode;
   creating in the password device a message based on data comprising keystroke information and one of the challenge-responses to the challenge-data in the command message;
   transmitting the created message to the computing device;
   retrieving secret data from a stored secret data location within the password device;
   creating in the password device a message based on information comprising keystroke information, one of the challenge-responses to the challenge-data in the command message and the secret data retrieved from storage in the password device;
   receiving in the password device a message containing a public key;
   creating in the password device random data;
   encrypting in the password device the random data using the public key;
   transmitting from the password device the encrypted random data;
   manipulating in the password device the random data to produce a cryptographic key; and
   storing the cryptographic key in secret-data storage.

2. A method of verifying a password, entered via a keyboard, for a computing device prior to permitting access, comprising the steps of:
   providing a password device, in communication with the keyboard and the computing device, to receive one or more messages, receive keystroke information comprising a manifestation of the pressing of keys on the keyboard, create one or more messages and transmit the one or more message created;
   receiving in the password device a command message comprising a command for the password device to operate in a special mode and challenge-data having one or more corresponding challenge-responses;
   receiving keystroke information in the password device during the special mode;
   receiving in the password device a command to stop operating in the special mode;
   creating in the password device a message based on data comprising keystroke information and one of the challenge-responses to the challenge-data in the command message;
   transmitting the created message to the computing device;
   retrieving secret data from a stored secret data location within the password device;
   creating in the password device a message based on information comprising keystroke information, one of the challenge-responses to the challenge-data in the command message and the secret data retrieved from storage in the password device;
   creating in the password device a digital signature based on information comprising keystroke information, one of the one or more challenge-responses to the challenge-data in the command message and the secret data retrieved from storage in the password device; and
   creating in the password device a message based on information comprising keystroke information, one of the challenge-responses to the challenge-data in the command message, the secret data retrieved from storage in the password device, and the digital signature.

3. A method of verifying a password, entered via a keyboard, for a computing device prior to permitting access, comprising the steps of:
   providing a password device, in communication with the keyboard and the computing device, to receive one or more messages, receive keystroke information comprising a manifestation of the pressing of keys on the keyboard, create one or more messages and transmit the one or more message created;
   receiving in the password device a command message comprising a command for the password device to operate in a special mode and challenge-data having one or more corresponding challenge-responses;
   receiving keystroke information in the password device during the special mode;
   receiving in the password device a command to stop operating in the special mode;
   creating in the password device a message based on data comprising keystroke information and one of the challenge-responses to the challenge-data in the command message;
   transmitting the created message to the computing device;
   retrieving from storage device identification information;

creating in the password device a message based on information comprising keystroke information, one of the challenge-responses to the challenge-data in the command message, and the device identification information;

creating in the password device a digital signature based on information comprising keystroke information, one of the challenge-responses to the challenge-data in the command message, the device identification information and the secret data retrieved from storage in the password device; and creating in the password device a message based on information comprising keystroke information, one of the challenge-responses to the challenge-data in the command message, the secret data retrieved from storage in the password device, the digital signature, and the device identification information.

4. A method for authenticating a user to a computer based on a user name and password, comprising the steps of:

the computer being prompted to generate and transmit session-specific data;

a password device receiving the session-specific data;

the password device entering a special mode;

the password device receiving keystroke information;

the password device retrieving secret data stored in the password device;

the password device generating and transmitting one or more messages based on the received session-specific data, the keystrokes and the secret data;

the password device transmitting a password device ID;

the computer receiving the one or more transmitted message and receiving the password-device-ID;

the computer or a second computer transmitting user identification information;

the computer receiving the user identification information;

the computer retrieving user data based on the user identification information;

the computer retrieving password device data based on the password device ID;

the computer validating the one or more received message based on the user data, the password device data and session specific data;

the computer transmitting a computer public key;

receiving in the password device a message containing the computer public key;

creating in the password device a first random data, and encrypting in the password device the first random data using the computer public key;

transmitting from the password device the encrypted random data;

transmitting from the password device a message containing the password device public key;

receiving in the computer the encrypted random data;

receiving in the computer a message containing the password device public key;

creating in the computer a second random data;

encrypting in the computer the second random data;

transmitting from the computer the second encrypted random data;

receiving in the password device the second encrypted random data;

decrypting random data in the password device, using a password device private key associated with the password device public key;

storing, in the password device, secret-data-storage data created using the first random data and the decrypted second encrypted random data;

decrypting the first encrypted random data in the computer using the computer private key associated with the computer public key, and storing, in the computer, secret-data-storage data created using the second random data and the decrypted first encrypted random data.

* * * * *